United States Patent
Sohma et al.

(10) Patent No.: US 8,355,578 B2
(45) Date of Patent: Jan. 15, 2013

(54) IMAGE PROCESSING APPARATUS, IMAGE PROCESSING METHOD, AND STORAGE MEDIUM

(75) Inventors: Hidetomo Sohma, Yokohama (JP); Tomotoshi Kanatsu, Tokyo (JP); Ryo Kosaka, Tokyo (JP); Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 13/039,588

(22) Filed: Mar. 3, 2011

(65) Prior Publication Data
US 2011/0229035 A1 Sep. 22, 2011

(30) Foreign Application Priority Data
Mar. 16, 2010 (JP) ................. 2010-059160

(51) Int. Cl.
G06K 9/34 (2006.01)

(52) U.S. Cl. ............ 382/176; 382/195; 382/198

(58) Field of Classification Search ............. 382/173, 382/176, 180, 190, 195, 198, 203, 219, 286, 382/305, 306
See application file for complete search history.

(56) References Cited

U.S. PATENT DOCUMENTS

| | | | |
|---|---|---|---|
| 6,169,998 B1 | 1/2001 | Iwasaki et al. | |
| 7,050,630 B2 * | 5/2006 | Simske et al. | 382/176 |
| 7,170,647 B2 | 1/2007 | Kanatsu | |
| 7,287,222 B2 | 10/2007 | Takata et al. | |
| 7,298,900 B2 | 11/2007 | Kanatsu | |
| 7,382,939 B2 | 6/2008 | Kanatsu | |
| 7,693,895 B2 * | 4/2010 | Takayama et al. | 707/705 |
| 7,965,892 B2 | 6/2011 | Kanatsu | |
| 2005/0027745 A1 | 2/2005 | Sohma et al. | |
| 2007/0239710 A1 | 10/2007 | Jing et al. | |
| 2008/0080769 A1 | 4/2008 | Kanatsu | |
| 2009/0290192 A1 | 11/2009 | Kosaka | |
| 2009/0324080 A1 | 12/2009 | Yamazaki et al. | |
| 2011/0252315 A1 | 10/2011 | Misawa et al. | |

FOREIGN PATENT DOCUMENTS

| | | |
|---|---|---|
| JP | 11-025113 | 1/1999 |
| JP | 2009-211554 | 9/2009 |

OTHER PUBLICATIONS

Great Britain Office Action dated Jun. 30, 2011, in Application No. GB1104436.9.

* cited by examiner

*Primary Examiner* — Phuoc Tran
(74) *Attorney, Agent, or Firm* — Fitzpatrick, Cella, Harper & Scinto

(57) ABSTRACT

Even when captions of a plurality of objects use an identical anchor expression, the present invention can associate an appropriately explanatory text in a body text as metadata with the objects.

10 Claims, 24 Drawing Sheets

| AREA | ATTRIBUTE | AREA ACCOMPANIED BY CAPTION | COORDINATE X | COORDINATE Y | WIDTH W | HEIGHT H | PAGE | CHARACTER RECOGNITION INFORMATION |
|---|---|---|---|---|---|---|---|---|
| 501 | HEADING | - | X1 | Y1 | W1 | H1 | 1 | SAMPLE |
| 502 | TABLE | - | X2 | Y2 | W2 | H2 | 1 | - |
| 503 | PHOTOGRAPH | - | X3 | Y3 | W3 | H3 | 1 | - |
| 504 | CHARACTER (IN PHOTOGRAPH 503) | - | X4 | Y4 | W4 | H4 | 1 | NEW PRODUCT |
| 505 | CAPTION | 503 | X5 | Y5 | W5 | H5 | 1 | FIG. 1 AAA |
| 506 | BODY TEXT | - | X6 | Y6 | W6 | H6 | 1 | ...FIG. 1 IS XX REGARDING AAA ... |

FIG.5B

| PROCESSING DETAILS \ ATTRIBUTE | CHARACTER | PHOTOGRAPH | DRAWING (LINE DRAWING) | TABLE |
|---|---|---|---|---|
| CONVERSION PROCESSING | VECTOR CONVERSION | IMAGE CUTOUT | VECTOR CONVERSION | VECTOR CONVERSION (TABLE FRAME PART) |
| DELETION PROCESSING | YES | YES | YES | YES |

FIG.5C

```
<?xml version="1.0" ?>
<svg xmlns="http://www.w3.org/2000/svg"width="2480" height="3520"
    xmns:x="http://@@@.jp">
                                                                    600

601 {  <text x="X1" y="Y1" color="#000000">SAMPLE</text>

602 {  <g>
     <path stroke="#000000" d="M X4,Y4 L…"/>
     ……
    </g>
                                  608
    <g x:caption_id = "1">
603 {    <image x="X3" y="Y3" width="W3" height="H3"
         xlink:href="data:image/png;base64,Dez3632fsod6Xhd0dsc4d …….
         "/>
        ……
    </g>

604 {  <text x="X4" y="Y4" color="#000000">NEW PRODUCT</text>

605 {  <text x="X5" y="Y5" color="#000000">FIG. 1 AAA</text>

606 {  <text x="X6" y="Y6" color="#000000">… FIG. 1 IS XX REGARDING
       AAA.…</text>
    <desc>
607 {   <metadata>       609
        <x:meta id="1" x:meta_type="textInObject"str="NEW PRODUCT"/>
        <x:meta id="1" x:meta_type="caption"str="FIG. 1 AAA"/>
        <x:meta id="1" x:meta_type="anchor"str="FIG. 1"/>
        <x:meta id="1" x:meta_type="textInBody"str="FIG. 1 IS XX
        REGARDING AAA."/>
      </metadata>
    </desc>
</svg>
```

FIG.6A

| CAPTION IDENTIFIER | ADDITION TARGET | EXTRACTED FROM | PAGE | EXTRACTION INFORMATION TYPE | EXTRACTED INFORMATION |
|---|---|---|---|---|---|
| 1 | 503 | 504 | 1 | CHARACTER IN OBJECT | NEW PRODUCT |
| 1 | 503 | 505 | 1 | CAPTION | FIG. 1 AAA |
| 1 | 503 | 505 | 1 | ANCHOR EXPRESSION | FIG. 1 |
| 1 | 503 | 506 | 1 | EXPLANATORY TEXT IN BODY TEXT | FIG. 1 IS XX REGARDING AAA. |

FIG.6B

| AREA | ATTRIBUTE | AREA ACCOMPANIED BY CAPTION | COORDINATE X | COORDINATE Y | WIDTH W | HEIGHT H | PAGE | CHARACTER RECOGNITION INFORMATION |
|---|---|---|---|---|---|---|---|---|
| 908 | BODY TEXT | – | X08 | Y08 | W08 | H08 | 1 | …CAMERA AAA (FIG. 1) IS … |
| 910 | BODY TEXT | – | X10 | Y10 | W10 | H10 | 2 | …… |
| 911 | PHOTOGRAPH | – | X11 | Y11 | W11 | H11 | 3 | – |
| 912 | CAPTION | 911 | X12 | Y12 | W12 | H12 | 3 | FIG. 1 AAA |
| 913 | BODY TEXT | – | X13 | Y13 | W13 | H13 | 4 | … INK JET PRINTER BBB (FIG. 1) IS … |
| 915 | BODY TEXT | – | X15 | Y15 | W15 | H15 | 5 | … SCANNER CCC HAVING ADF (FIG. 2) IS FOR … A LARGE AMOUNT OF … |
| 917 | PHOTOGRAPH | – | X17 | Y17 | W17 | H17 | 6 | – |
| 918 | CAPTION | 917 | X18 | Y18 | W18 | H18 | 6 | FIG. 1 BBB |
| 919 | PHOTOGRAPH | – | X19 | Y19 | W19 | H19 | 7 | – |
| 920 | CAPTION | 919 | X20 | Y20 | W20 | H20 | 7 | FIG. 1 CCC |

FIG. 9B

| CAPTION EXPRESSION | AAA |
| --- | --- |
| CAPTION WORD | AAA |
| ATTRIBUTE OF CAPTION WORD | NOUN |
| COMPARISON TARGET CANDIDATE? | ○ |
| WORD DISTANCE | - |
| WEIGHT | 1 |

FIG.12A

| EXPLANATORY TEXT IN BODY TEXT | CAMERA AAA (FIG. 1) IS FOR THE PHOTOGRAPHING OF A SCENERY FOR EXAMPLE ....... |  |  |  |  |  |  | ... |
|---|---|---|---|---|---|---|---|---|
| EXPLANATORY TEXT WORD | CAMERA | AAA | ( | FIG. 1 | ) | IS | , | SCENERY | FOR EXAMPLE |
| ATTRIBUTE OF EXPLANATORY TEXT WORD | NOUN | NOUN | SYMBOL | (ANCHOR EXPRESSION) | SYMBOL | PARTICLE | COMMA | NOUN | PARTICLE |
| COMPARISON TARGET CANDIDATE | ○ | ○ | × | (×) | × | × | × | ○ | × |
| ORDER OF EXPLANATORY TEXT WORD STRING | 2 | 3 | – | – | – | – | – | 1 | – |
| WORD DISTANCE | 3 | 2 | 1 | 0 | 1 | 2 | 3 | 4 | 5 |
| WEIGHT | 0.33 | 0.5 | – | – | – | – | – | 0.25 | – |

FIG.12B

| CAPTION IDENTIFIER | ADDITION TARGET | EXTRACTED FROM | PAGE | EXTRACTION INFORMATION TYPE | EXTRACTION INFORMATION |
|---|---|---|---|---|---|
| 1 | 911 | 908 | 1 | EXPLANATORY TEXT IN BODY TEXT | CAMERA AAA (FIG. 1) IS FOR SCENERY ... |
| 1 | 911 | 912 | 3 | ANCHOR EXPRESSION | FIG. 1 |
| 1 | 911 | 912 | 3 | CAPTION | FIG. 1 AAA |
| 2 | 917 | 913 | 4 | EXPLANATORY TEXT IN BODY TEXT | INKJET PRINTER BBB (FIG. 1) IS ... |
| 3 | 919 | 915 | 5 | EXPLANATORY TEXT IN BODY TEXT | SCANNER CCC HAVING ADF (FIG. 2) IS ... . |
| 2 | 917 | 918 | 6 | ANCHOR EXPRESSION | FIG. 1 |
| 2 | 917 | 918 | 6 | CAPTION | FIG. 1 BBB |
| 3 | 919 | 920 | 3 | ANCHOR EXPRESSION | FIG. 2 |
| 3 | 919 | 920 | 3 | CAPTION | FIG. 2 CCC |

FIG.13

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium by which electronic document data for searching an object in a document is generated.

2. Description of the Related Art

Conventionally, an approach has been considered to provide a search of an object included in a document, such as a photograph, a drawing (line drawing), or a table. (The term "object" is used herein to include an object other than characters such as a photograph, a drawing (line drawing), or a table.)

For example, a method exists by which, in the vicinity of an object extracted from a document, a character string describing the object (caption) is added and this is associated as metadata so that the object can be searched.

When a caption in a general document includes an expression for identifying the object, such as a drawing number (e.g., "photograph 1", "first drawing" or "table 1") (hereinafter referred to as "anchor expression"), a more detailed description of the object is also described in a body text using the anchor expression. The anchor expression as described above has been also used as a means for identifying an object in a document. According to the invention disclosed in Japanese Patent Laid-Open No. H11-025113 (1999), an explanatory part of a body text including an anchor expression (hereinafter referred to as "explanatory text in body text") is extracted and is associated as metadata for the object. When a caption adjacent to an object of a drawing includes an anchor expression "Fig. 1" and a body text includes the explanation "the Fig. 1 is AAA" for example, an anchor expression "Fig. 1" is associated as identification information of the object of the drawing. At the same time, the explanatory text in the body text of "the Fig. 1 is AAA" is also associated as metadata, thereby providing a search by the metadata of the object of the drawing.

In recent years, some word processors, for example, have an editing function such as a function to automatically generate an anchor expression and a function to associate an object existing in a document with an explanatory text in a body text. The information given through these functions (metadata) can be stored in an electronic document to thereby realize the efficient editing of the document.

Scanners in recent years have a function such as an auto document feeder and thus can read many pages of papers easily. Thus, such scanners also can simultaneously read a plurality of types of documents. When such a scanner must read a mixture of different documents on the other hand, there is a possibility that a plurality of objects are read that have captions using an identical anchor expression. For example, there may be a case where one of the simultaneously-read documents has a table object having the caption "the table 1 is YYY" and another document thereamong has a table object having the caption "the table 1 shows ZZZ." If the above-described association processing is simply performed in such a circumstance, the anchor expression for the same "table 1" is associated with the two table objects, thus failing to provide an explanatory text in a body text that appropriately corresponds to the anchor expression for "the table 1."

Due to the above situation, such a method has been desired by which, even when a plurality of types of documents must be read and a plurality of captions use an identical anchor expression, a caption or an explanatory text in a body text can be appropriately associated as metadata with the object.

SUMMARY OF THE INVENTION

An image processing apparatus according to the present invention includes: an area division unit configured to divide an image of a plurality of pages into a plurality of areas, respectively; an attribute information addition unit configured to add, to the respective plurality of divided areas, attributes depending on the areas; a character recognition unit configured to perform character recognition processing on a caption area and a body text area of the plurality of areas to which a caption attribute and a body text attribute are added by the attribute information addition unit, respectively; and a metadata processing unit configured to associate metadata with an object area accompanied by the caption area. The metadata processing unit comprises: a first extraction unit configured to extract, from the result of the character recognition processing to the caption area, an anchor expression composed of a predetermined character string and a caption expression composed of a character string other than the anchor expression; a determination unit configured to determine whether there are a plurality of object areas accompanied by caption areas including an identical anchor expression; a second extraction unit configured to extract, from the result of the character recognition processing on the body text area, an explanatory text including the anchor expression; a first association unit configured to associate, when the determination unit determines that there is one object area accompanied by a caption area including the identical anchor expression, the object area with metadata obtained from the explanatory text extracted by the second extraction unit; a similarity degree calculation unit configured to calculate, when the determination unit determines that there are a plurality of object areas accompanied by caption areas including the identical anchor expression, similarity degrees between caption expressions of the respective caption areas including the anchor expression and the explanatory text including the anchor expression extracted by the second extraction unit, respectively; and a second association unit configured to determine, based on the similarity degrees calculated by the similarity degree calculation unit, such explanatory texts that are optimal for the respective plurality of object areas to associate metadata obtained from the determined optimal explanatory texts to the object areas.

According to the present invention, even if there are a plurality of objects including an identical anchor expression, the objects can be associated with appropriate metadata. Thus, even out of image data including a mixture of a plurality of documents, such an electronic document can be prepared that has appropriate metadata added to the individual objects.

Further features of the present invention will become apparent from the following description of exemplary embodiments (with reference to the attached drawings).

BRIEF DESCRIPTION OF THE DRAWINGS

FIG. 5A to FIG. 5C illustrate the processing details of the processing performed by a data processing unit 218. FIG. 5A illustrates how image data is divided into areas. FIG. 5B is a table illustrating an example of the processing result by an area division unit 301, an attribute information addition unit 302, and a character recognition unit 303. FIG. 5C illustrates an example of the correspondence table used by a format conversion unit 305;

FIG. 6A and FIG. 6B illustrate an electronic document generated in the present invention. FIG. 6A illustrates an example of an electronic document described by an SVG format. FIG. 6B illustrates metadata in the electronic document by a table;

FIG. 9A and FIG. 9B illustrate the processing by the image processing apparatus according to the present invention. FIG. 9A illustrates an example of image data inputted to the data processing unit 218 and an area division thereto. FIG. 9B is a table illustrating an example of the processing result in the case of the image data by the area division unit 301, the attribute information addition unit 302, and the character recognition unit 303;

FIG. 12A and FIG. 12B illustrate the intermediate result obtained through the processing for calculating the degree of similarity. FIG. 12A illustrates an example of the result obtained through the processings to Step 1103. FIG. 12B illustrates an example of the processings in Steps 1105 and 1106;

FIG. 13 illustrates, by a table, the metadata information obtained by subjecting image data 901 to 907 of FIG. 9A to the processing according to Embodiment 1;

FIG. 14 is a diagram showing the relationship between FIGS. 14A and 14B;

DESCRIPTION OF THE EMBODIMENTS

Embodiment 1

The following section will describe an embodiment for carrying out the present invention with reference to the drawings.

Figure 1:
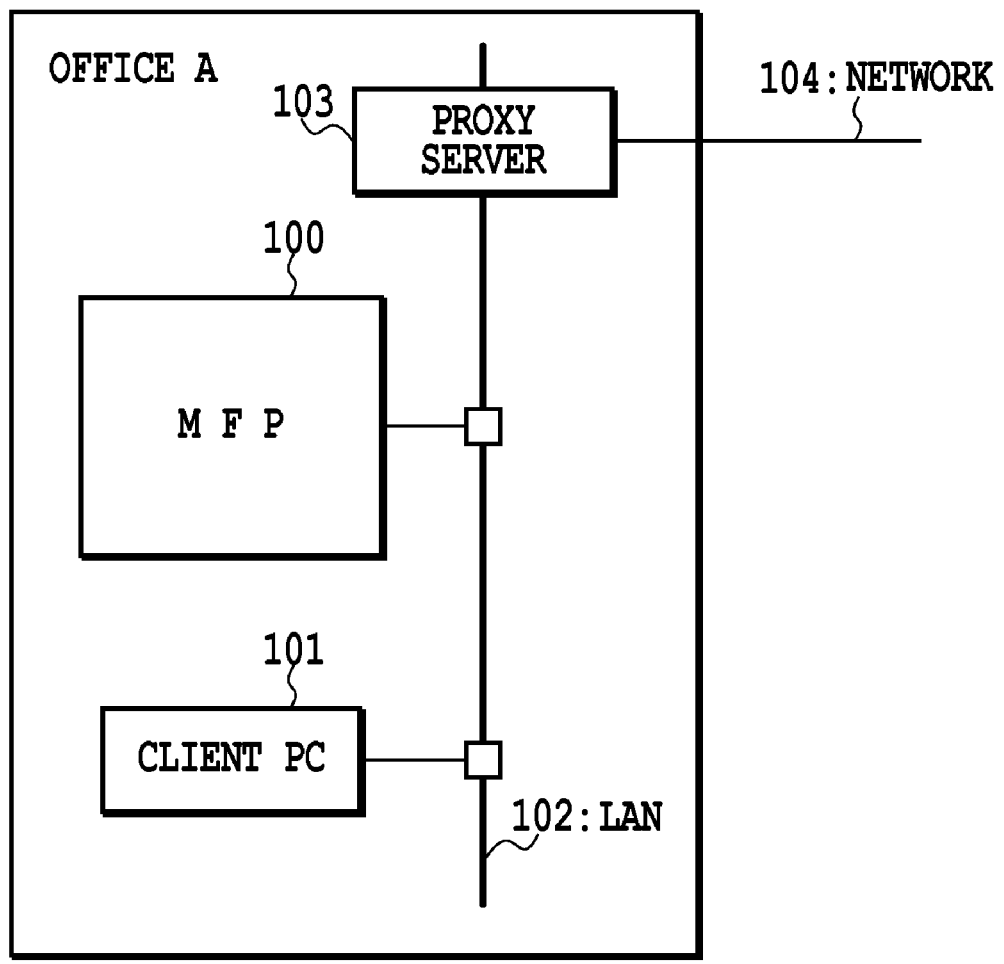
FIG. 1 is a block diagram illustrating the configuration of an image processing system according to the present invention.

FIG. 1 is a block diagram illustrating the configuration of an image processing system according to this embodiment.

In FIG. 1, a LAN 102 structured in the office A is connected to a Multi Function Peripheral (MFP) 100 that is an image processing apparatus for realizing a plurality of types of functions (e.g., a copying function, a printing function, a transmission function). The LAN 102 is also connected, via a proxy server 103, to an external network 104. A client PC 101 receives, via the LAN 102, data transmitted from the MFP 100 and uses a function performed by the MFP 100. For example, the client PC 101 also can transmit printing data to the MFP 100 to thereby cause printed matter based on the printing data to be printed through the MFP 100. The configuration of FIG. 1 is an example. Thus, another configuration also may be used where a plurality of offices having the same constituting elements as those of the office A are connected via a network 104. The network 104 is typically a communication network that is realized by the Internet, LAN, WAN, a phone line, an exclusive digital line, ATM, a frame relay line, a communication satellite line, a cable television line, or a data broadcasting wireless line for example. The network 104 may be any network so long as data can be sent and received therethrough. The respective terminals of the client PC 101 and the proxy server 103 have standard constituting elements provided in a general-purpose computer including, for example, a CPU, a RAM, a ROM, a hard disk, an external storage apparatus, a network interface, a display, a keyboard, and a mouse.

Figure 2:
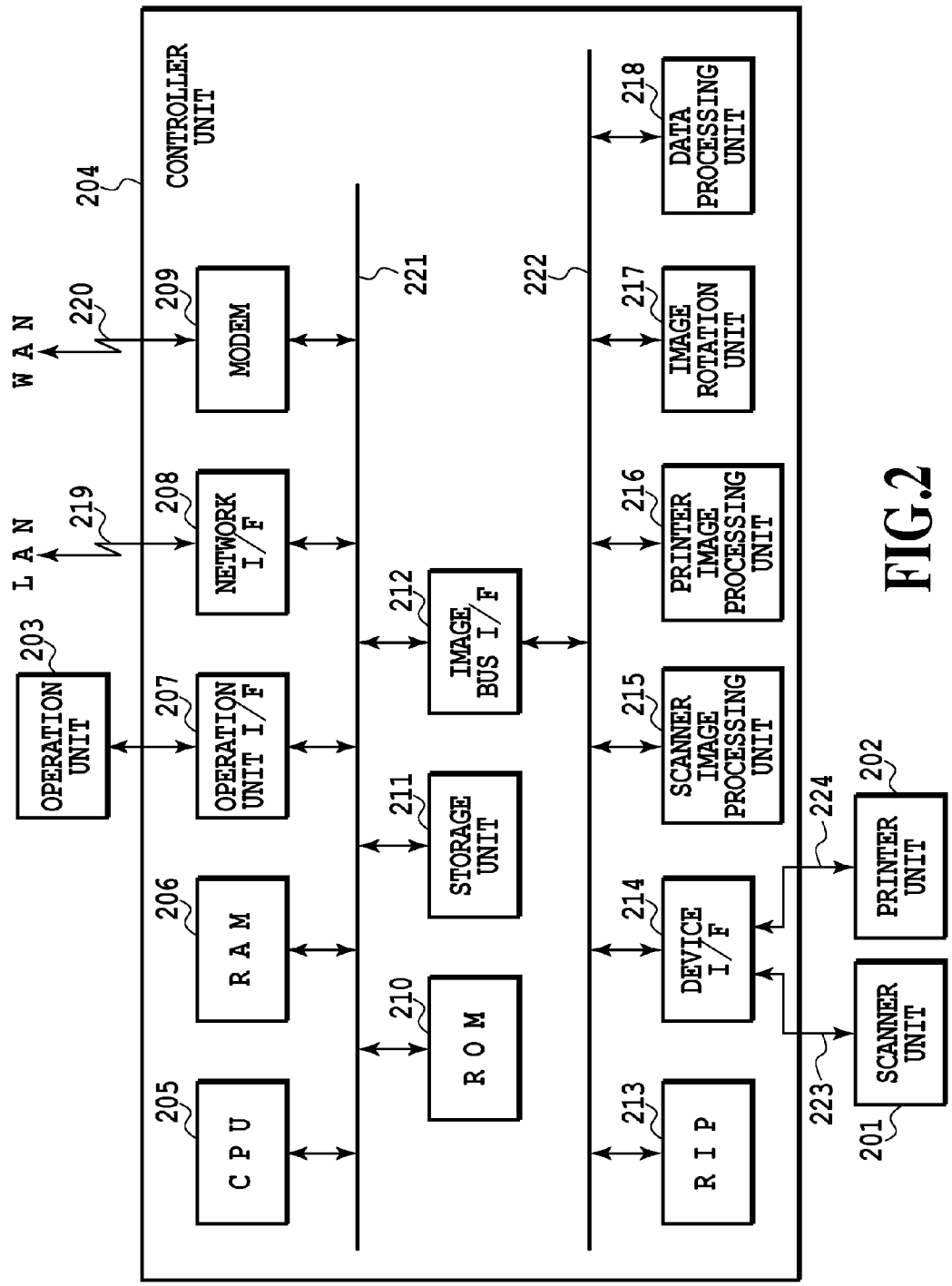
FIG. 2 illustrates the configuration of an MFP 100.

FIG. 2 illustrates the configuration of the MFP 100.

First, the configuration of the MFP 100 is mainly comprised of a scanner unit 201 that is an image input device, a printer unit 202 that is an image output device, a control unit 204 configured by a CPU 205, and an operation unit 203 that is a user interface.

The control unit 204 is connected to the scanner unit 201, the printer unit 202, and the operation unit 203. The control unit 204 is also a controller that is connected to the LAN 219 or a public line (WAN) 220 that is a general phone line network to thereby provide an input and an output of image information and device information.

The CPU 205 controls the respective units included in the control unit 204.

The RAM 206 is a system work memory for the operation of the CPU 205 and is also an image memory for temporarily storing image data.

The ROM 210 is a boot ROM in which a program such as a system boot program is stored.

A storage unit 211 is a hard disk drive in which system control software and image data are stored.

An operation unit I/F 207 is an interface unit with an operation unit (UI) 203 that outputs, to the operation unit 203, image data to be displayed on the operation unit 203. The operation unit I/F 207 also has a function to transmit, to the CPU 205, information inputted by a user of this image processing apparatus through the operation unit 203.

A network I/F 208 connects this image processing apparatus to the LAN 219 to provide an input and an output of packet-type information.

A modem 209 connects this image processing apparatus to a WAN 220 to provide data demodulation and modulation to thereby provide an input and an output of information. The devices as described above are arranged on a system bus 221.

An image bus I/F 212 is a bus bridge that connects the system bus 221 to an image bus 222 for transferring image data at a high speed to convert the data structure thereof.

The image bus 222 is composed, for example, of a PCI bus and an IEEE 1394. The image bus 222 has thereon the following devices.

A raster image processor (RIP) 213 realizes a so-called rendering processing to analyze a page description language (PDL) code to develop the code to a bitmap image having a specified resolution. This development adds attribute information on the basis of a pixel unit or an area unit. This is called an image area determination processing. By the image area determination processing, attribute information showing the object type such as characters (text), a line, graphics, or an image is added with regard to each pixel or each area. For example, depending on the type of the object of the PDL description in a PDL code, an RIP 213 outputs an image area signal. Then, the attribute information depending on the attribute shown by the signal value is stored while being associated with a pixel or an area corresponding to the object. Thus, the image data is accompanied by the attribute information associated thereto.

A device I/F 214 connects, via a signal line 223, the scanner unit 201 as an image input device to the control unit 204. The device I/F 214 also connects, via a signal line 224, the printer unit 202 as an image output device to the control unit 204. The device I/F 214 provides a synchronous/asynchronous conversion of image data.

A scanner image processing unit 215 corrects, processes, and edits inputted image data.

A printer image processing unit 216 subjects print output image data to be outputted to the printer unit 202, to a correction and a resolution conversion depending on the printer unit 202 for example.

An image rotation unit 217 rotates the inputted image data so as to erect the data and outputs the data.

The data processing unit 218 will be described in detail with reference to FIG. 3.

<Data Processing Unit>

Figure 3:
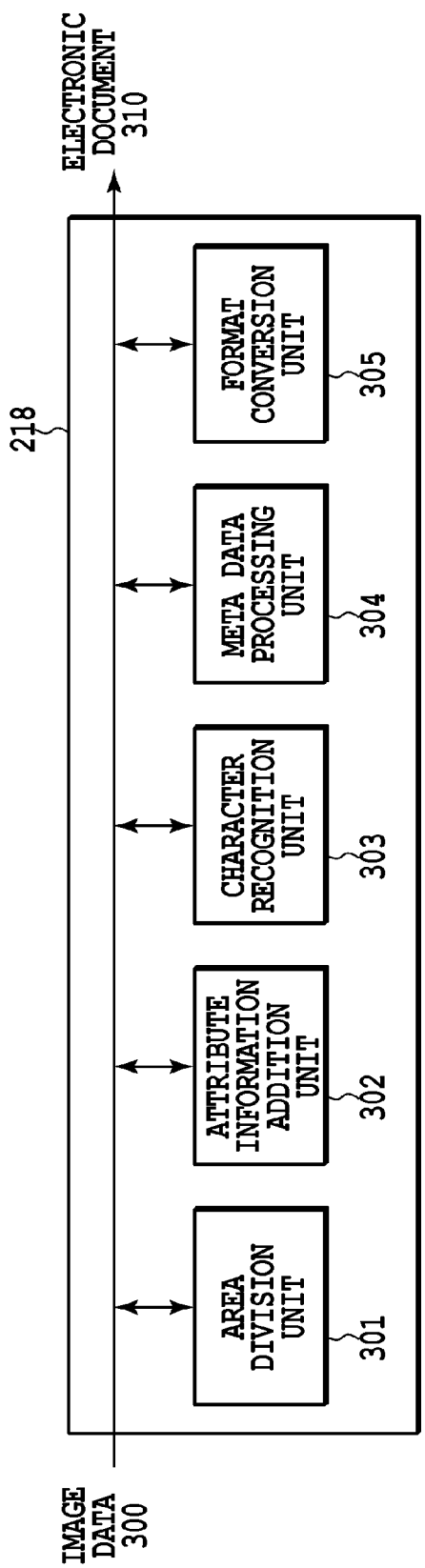
FIG. 3 is a block diagram illustrating the internal configuration of a data processing unit 218.

As shown in FIG. 3, the data processing unit 218 is composed of: an area division unit (area extraction unit) 301, an attribute information addition unit 302, a character recognition unit 303, a metadata processing unit 304, and a format conversion unit 305. The data processing unit 218 subjects inputted image data 300 to the predetermined processings by the respective processing units 301 to 305. Finally, an electronic document 310 is generated and outputted.

Figure 5A:
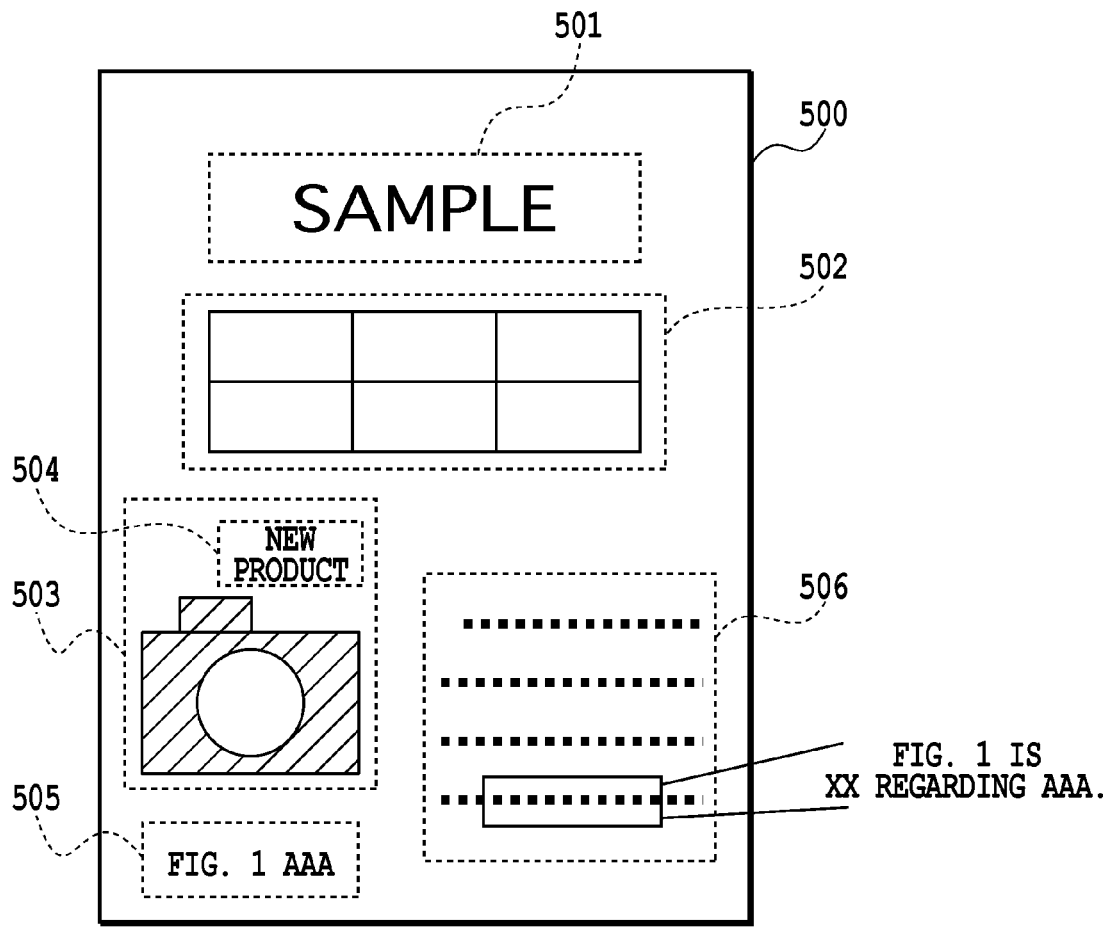

The area division unit 301 receives image data read by the scanner unit 201 or image data that is received from an external apparatus such as a client PC and that is stored in the storage unit. In order to extract on the basis of a page unit, from the inputted image data, areas divided based on each attribute such as a character, a photograph, a drawing, or a table, the pixels in the image data are subjected to a processing such as extraction or grouping. This can be performed by a known area division method (area extraction method). An example of such a method will be described below. First, an input image is binarized to generate a binary image. Then, the binary image is caused to have a lower resolution to thereby prepare a culling image (reduced image). For example, in order to prepare a 1/(M×N) thinning image, the binary image is divided to correspond to the respective M×N pixels. If the M×N pixels include black pixels, corresponding pixels in the reduced image are set as black pixels. If the M×N pixels do not include black pixels, corresponding pixels in the reduced image are set as white pixels. In this manner, a thinning image is prepared. Next, parts at which black pixels are connected (connecting black pixels) in the thinning image are extracted to thereby prepare a rectangle circumscribed by the connecting black pixels. When rectangles having a similar size as that of a character image (rectangles for one character) are arranged or when similar rectangles whose height or width is similar to that of a character image size (rectangles of connecting black pixels which connected a plurality of characters) are arranged in the vicinity of the short sides, these rectangles may compose character images constituting a character row with a high possibility. In this case, the rectangles are connected to one another to thereby obtain a rectangle representing one character row. In the case of a collection of rectangles that represent one character row whose short sides have substantially the same length and that are arranged in a column direction at substantially-equal intervals, there is a possibility that this collection may represent a body text. Thus, these rectangles are connected and the resultant part is extracted as a body text area. A photograph area, a drawing area, and a table area are extracted by connected black pixels whose size is bigger than that of a character image. As a result, the respective areas as shown by the reference numerals 501 to 506 of FIG. 5A are extracted, for example. The attributes of the respective areas are determined, as described later, based on the sizes, the aspect ratio, or the black pixel density, or the contour tracing result of white pixels included in the connecting black pixels, for example.

The attribute information addition unit 302 adds the attribute information to the respective areas divided by the area division unit 301. The following description will be made based on the assumption that image data 500 is divided by the area division unit 301 as shown in FIG. 5A.

An area 506 in a page includes therein characters and lines the number of which is equal to or higher than a predetermined number and has the form of a paragraph, for example. Thus, the area 506 is added with a "body text" attribute. In order to simply illustrate the drawing, the characters included in the area 506 of FIG. 5A are represented by black points. However, the area 506 actually includes a plurality of character images.

With regard to the remaining areas 501 to 505, whether the areas 501 to 505 are areas including characters or not is determined. Specifically, in the case of an area including characters, rectangles for character images appear in the area cyclically. Thus, whether the area is an area including rectangles whose size is similar to a character image size or not is determined. As a result, the area 501, the area 504, and the area 505 are determined as areas including characters and a "character-including area" attribute is added thereto.

With regard to an area other than the above-described ones on the other hand, the size of the area is firstly determined. When the area size is very small, the attribute thereof is determined as "noise". When the area size is not so small and is equal to or larger than a fixed size, the area is an area containing some object. Thus, this area is further subjected to the following determination to determine the attribute to be added to the area (i.e., to which object this area corresponds). First, white pixels in connecting black pixels having a low pixel density are subjected to contour tracing. Then, whether rectangles circumscribing the white pixel contours are orderly arranged or not is determined. When the rectangles circumscribing the white pixel contours are orderly arranged, then the area is determined to have a "table" attribute. When the rectangles circumscribing the white pixel contours are not orderly arranged, the area is determined to have a "drawing (line drawing)" attribute. Areas other than this area that have a high pixel density are determined as corresponding to a picture or a photograph and are determined to have a "photograph" attribute. In the above section, an area was classified based on the three types of object attributes of "photograph", "drawing (line drawing)", and "table". However, the present invention is not limited to this. Other determination criteria also may be used so that an area can be classified based on arbitrary types of object attributes.

If a character-including area exists adjacent to (or just above or just below) an object area to which an attribute such as "photograph", "drawing", or "table" is added, it is determined that this area is an area of characters for describing the object area and thus "caption" attribute is added thereto. An area to which "caption" attribute is added is stored while being associated with an area such as "photograph", "drawing", or "table" accompanied by the caption so that the latter area can be identified.

When an area is larger than the character image of a body text part and is at a position different from the position of the column setting of the body text part, a "heading" attribute is added to this area. When an area is larger than the character image of a body text part and exists at the upper side of the column setting of the body text part, a "subheading" attribute is added to this area. When an area is for a character image having a smaller size than the size of the character image of the body text part and exists at a lower end or an upper end of a manuscript, a "page" attribute is added to this area (or "page header" or "page footer"). In the case of the area that was determined as a character-including area and that was not determined as "body text", "heading", "subheading", "caption", or "page", a "character" attribute is added to this area.

By the processing for adding attribute information as described above, the image data 500 is set so that a heading attribute is added to an area 501, a table attribute is added to an area 502, a photograph attribute is added to an area 503, a character attribute is added to an area 504, a caption attribute is added to an area 505 (which accompanies the area 503), and a body text attribute is added to the area 506. The underlines given to the respective attributes for the areas 501, 504, and 505 show that a "character-including area" attribute is added thereto.

The character recognition unit 303 performs a known character recognition processing (OCR processing) on areas including character images (areas added with attributes of "character", "body text", "heading", "subheading", and "caption"). An in-table attribute may also be added to an area for a character image in a "table" and may be subsequently subjected to a character recognition processing. Then, a character code column obtained through the character recognition processing is stored as character recognition information and is associated to a target area.

As described above, the storage unit 211 stores therein the position and size of the area, the area attribute information, the page information, the information for the result of the character recognition processing (character code column) for example extracted by the respective units of the area division unit 301, the attribute information addition unit 302, and the character recognition unit 303. FIG. 5B illustrates, by a table, the result of the above-described processing of the image data 500. Thus, the result is stored in a table form in the storage unit 211. The area 504 is an area for a character image existing in a photograph 503. Thus, to the area 504 is added an attribute of "in photograph 503". Although the spaces in the table regarding the position and size of the area (e.g., coordinates X/Y, width W, height H) include marks such as X1, these spaces include therein numeric values in an actual case.

The object area such as "photograph", "drawing", or "table" determined by the attribute information addition unit 302 as an area accompanied by a caption is associated by the metadata processing unit 304 to metadata that functions as information for searching for the object. Then, the attribute information addition unit 302 stores the resultant data in the storage unit 211. Specifically, the attribute information addition unit 302 associates, as metadata for searching the object, a character string described as a caption for a specific object area to an explanatory part in a body text (an explanatory text in a body text) using an identical word as a word included in the character string, such as a figure number (anchor expression).

The association of metadata is performed by an identifier given to each object (hereinafter referred to as "caption identifier"). This caption identifier can be used to appropriately associate a caption or an explanatory text in a body text to an object area accompanied by the caption, respectively. By adding different caption identifiers to the individual objects, even when there are a plurality of objects that have captions including an identical anchor expression, metadata can be associated to the objects appropriately. In this embodiment, the caption identifier is an ID for uniquely identifying an object area accompanied by a caption (i.e., a serial number (positive integer) starting from a value "1"). The caption identifier also may be position information such as an address or a pointer that shows the position at which the character recognition information for a caption or a body text is stored or reference information such as XMLPath or URL.

The format conversion unit 305 uses the respective types of pieces of information (e.g., page information, the position or size of the area, attribute, character recognition information, metadata) obtained by the above-discussed respective processing units to convert the image data to an electronic document having a predetermined format. The predetermined format may be, for example, PDF, SVG, XPS, or OfficeOpenXML. The electronic document generated through the format conversion includes page display information of graphics for example (e.g., to-be-displayed image) and content information by semantic description, such as characters (e.g., metadata).

The format conversion unit 305 mainly performs the following two processings. One processing is to subject an image area to filter processings (e.g., histogram equalization, smoothing, edge emphasis, color quantization, binarization) so that the image data (e.g., an image of the part corresponding to an area to which is added a "drawing (line drawing)" attribute) can be stored in an electronic document having a predetermined format. The image data can be stored in an electronic document having a predetermined format by converting the image data to vector path description graphics data (vector data) or bitmap description graphics data (e.g., JPEG data). The conversion to vector data can be carried out by a known vectorization technique. This conversion also generates graphics description (vector path description) such as a frame that is displayed when the search result is identified or highlighted for an object search. The other processing is to add, to the generated vector data or bitmap data, area information (position, size, attribute), information for the character recognition in the area, and metadata stored in the storage unit 211 to thereby prepare an electronic document having a predetermined format.

A conversion processing method that should be performed by the format conversion unit 305 on each area frequently depends on the attribute of the area. For example, the vector conversion processing is suitable for a graphic that is composed of white and black or a small number of colors, such as a character or a line drawing, but is not suitable for an image area having a gradation, such as a photograph. In order to provide an appropriate conversion depending on the attribute of each area, a correspondence table as shown in FIG. 5C also may be provided in advance.

For example, the correspondence table shown in FIG. 5C is set so that areas having attributes of "character", "drawing (line drawing)", and "table" are subjected to a vector conversion processing, and an area having a "photograph" attribute is subjected to an image cutout processing as a conversion processing, respectively. The correspondence table shown in FIG. 5C is also set so that whether the pixel information of the area is deleted from the image data or not is set for each attribute. For example, when the data for an area having a "character" attribute is converted to vector path description data, the area is set to be subjected to the deletion processing. In this case, such a processing is performed that pixels corresponding to a part of the area covered by the converted vector path are filled with the surrounding color. Similarly, when the area having a "photograph" attribute is cut out as a rectangular image part, a region corresponding to the cutout region is filled with the surrounding color for example. The purpose of the deletion processing as described above is to use image data for which the respective areas are already subjected to the filling processing is also used as parts constituting the "background" image data. The background image data (background image) includes therein remaining parts other than the areas extracted by the area division processing (e.g., pixels corresponding to a foundation in image data). The data description of an electronic document is obtained by superposing the graphics data (foreground image) obtained by an unillustrated vector conversion processing unit or image cutout processing unit on the background image to thereby display the resultant image. This consequently can prevent a lack of information for background pixels (background color) and can configure nonredundant graphics data.

Alternatively, a plurality of correspondence tables also may be prepared in advance so that an appropriate correspondence table can be selected depending on an application of the electronic document. For example, when the correspondence table of FIG. 5C is used, the objects are mostly converted to have a vector path description, thus providing a high image quality for an enlarged or reduced display. Thus, another correspondence table is provided according to which different binary images for the respective character colors of character images are generated and are subjected to a lossless compression and images other than the above images are subjected as a background image to a JPEG compression, for example. The former is suitable for an application to reuse a graphic editor, for example. The latter is suitable for a case where such an electronic document is desired to be prepared for which character images can be easily read while achieving a high compression rate. By using different correspondence tables depending on an application, an appropriate electronic document suitable for an application for a user can be prepared.

FIG. 6A illustrates an example of an electronic document generated by the data processing unit 218. FIG. 6A shows an electronic document 600 that is generated based on the image data 500 of FIG. 5A and that is described based on the Scalable Vector Graphics (SVG) format. FIG. 6B illustrates information for metadata added to the electronic document 600 in the form of a table for simplicity.

In this case, the reference numerals 601 to 606 of FIG. 6A denote graphics descriptions corresponding to the areas 501 to 506 in the image data 500, respectively. The reference numerals 601 and 604 to 606 denote character drawing descriptions by character codes. The reference numeral 602 denotes a vector path description for the frame of the table subjected to a vector conversion. The reference numeral 603 denotes a description of a photograph image. The description 603 includes a caption identifier (caption_id) 608 of "1".

The reference numeral 607 denotes a description for metadata. The description 607 describes the characters in the photograph object of "new product", the caption "Fig. 1 AAA", an anchor expression in the caption of "Fig. 1", and an explanatory text in a body text of "Fig. 1 is XX regarding AAA" that is extracted based on the anchor expression and the character string of the body text. Furthermore, an identifier 609 that is identical with a caption identifier 608 is also described. Instead of the explanatory text in the body text (sentence) of "Fig. 1 is XX regarding AAA" that includes the anchor expression of "Fig. 1", a word "AAA" also may be extracted and may be added as metadata. Alternatively, the explanatory text in the body text and the word also may be both used as metadata. The same applies to a character string of a caption. Thus, a word extracted from a caption may be further added as metadata.

<Metadata Processing Unit>

Figure 4:
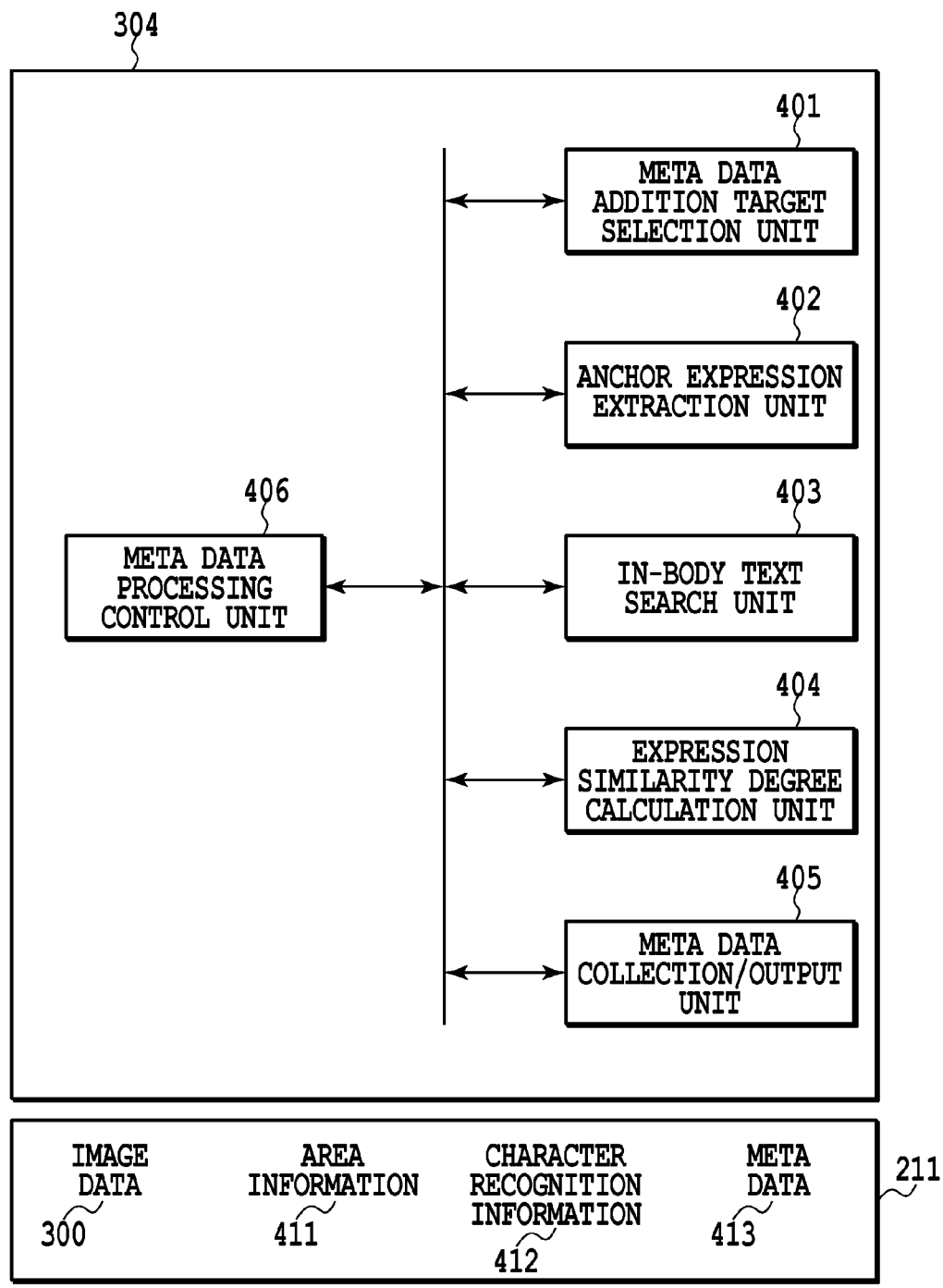
FIG. 4 is a block diagram illustrating the internal configuration of a metadata processing unit 304.

FIG. 4 is a block diagram illustrating the internal configuration of the metadata processing unit 304.

The reference numeral 401 denotes a metadata addition target selection unit that performs a processing to select, from inputted image data, an area to be subjected to the extraction/addition of metadata. In this embodiment, image data having a caption area is selected as a target to be subjected to the extraction/addition of metadata, such as a caption, an anchor expression, or an explanatory text in a body text.

The reference numeral 402 denotes an anchor expression extraction unit that extracts an anchor expression from the caption area selected by the metadata addition target selection unit 401. Specifically, the anchor expression extraction unit 402 analyzes the character recognition information associated to the selected caption area to search for the existence of any anchor expression such as "Fig. 1" in the character recognition information. When an anchor expression is found, the corresponding part is extracted as an anchor expression and parts other than the above part are extracted as a caption expression. This extraction process uses a character code characteristic or a dictionary, for example, to exclude an insignificant character string (e.g., a nonsense symbol string). This process consequently prevents a division line or an image appearing at a boundary of a text part of a document from being falsely recognized as a character in the character recognition operation. Furthermore, an anchor expression can be extracted by using a multilingual character string pattern, such as a drawing number or a false character recognition pattern applied to the character string pattern, to thereby accurately extract an anchor expression and to correct the characters of an anchor expression. A caption expression also can be subjected to an analysis by natural language processing or the correction of a false character recognition. Thus, a boundary with an anchor expression, a symbol, or a character decoration appearing at the top or end also can be corrected and excluded.

The reference numeral 403 denotes an in-body text search unit that searches for expression (sentence) in a body text including an anchor expression obtained by the anchor expression extraction unit 402 in the character recognition information associated to the body text area to extract this as an explanatory text in the body text. For realizing a high-speed search, a search index also may be prepared and used. The preparation of the index and a high-speed search using the index can be achieved by a known technique and are not a point in the present invention and thus will not be described further. Alternatively, many anchor expressions can be simultaneously searched to thereby realize a high speed. An explanatory text in a body text found in the search also can be combined with an anchor expression which is described with a multilingual character string pattern.

The reference numeral 404 denotes an expression similarity degree calculation unit that compares, based on the anchor expression, a caption expression with an explanatory text in a body text to calculate the degree of similarity therebetween. Specifically, the expression similarity degree calculation unit 404 compares the caption expression with the explanatory text in the body text by the character level or a natural language analysis to thereby make a comparison based on a word or meaning level. Then, the degree of similarity is calculated while paying attention to the positions of anchor expressions in the two expressions. The degree of similarity is a criterion that has an increased value when the two expressions have a character or word closer to the anchor expression. The details of the degree of similarity will be described later.

The reference numeral 405 denotes a metadata collection/output unit that collects metadata extracted by the above respective units to associate the metadata to image data to which the metadata will be added to thereby output the result to the format conversion unit 305.

The reference numeral 406 is a metadata processing control unit that allocates image data 300 to the appropriate processing units 401 to 405 based on the area information (position, size, attribute) 411, the in-area character recognition information 412, and the metadata 413 stored in the storage unit 211. Then, the metadata processing control unit 406 controls the entirety of the metadata processing unit 304 so that the data outputted from the respective processing units 401 to 404 can be integrated by the metadata collection/output unit 405.

Figure 7:
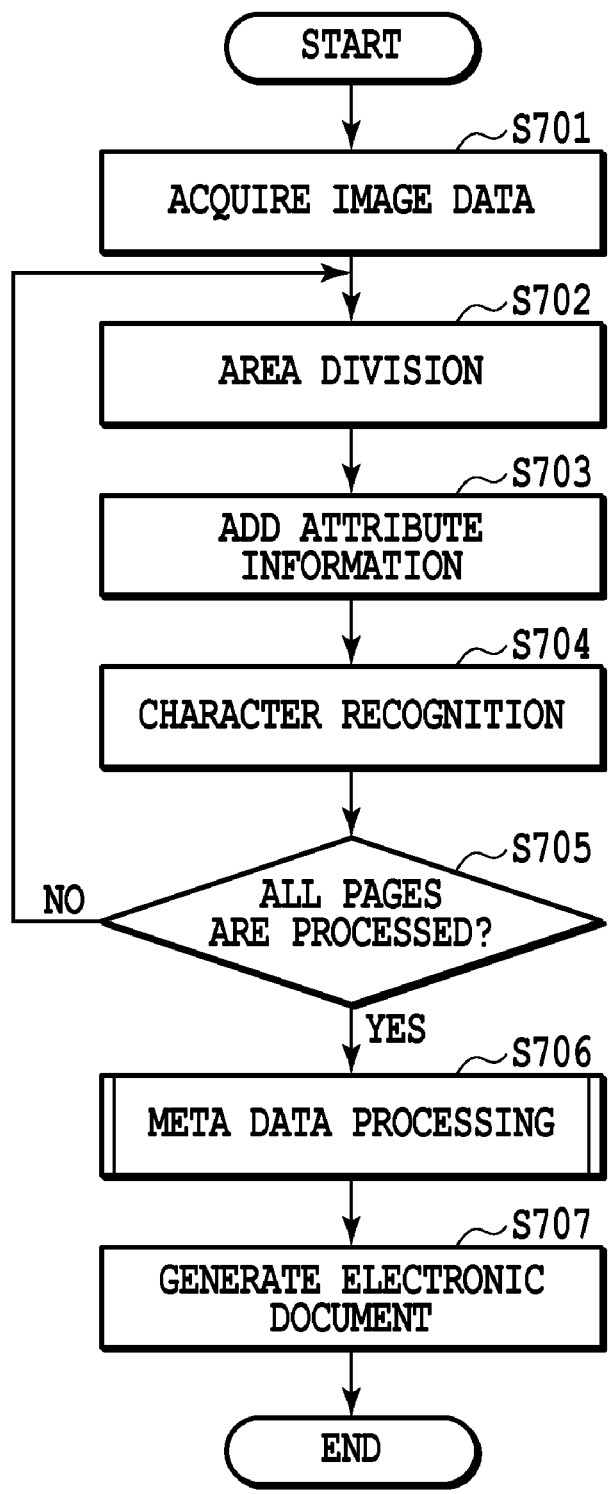
FIG. 7 is a flowchart illustrating the outline of the processing by the image processing apparatus according to the present invention.
Figure 9A:
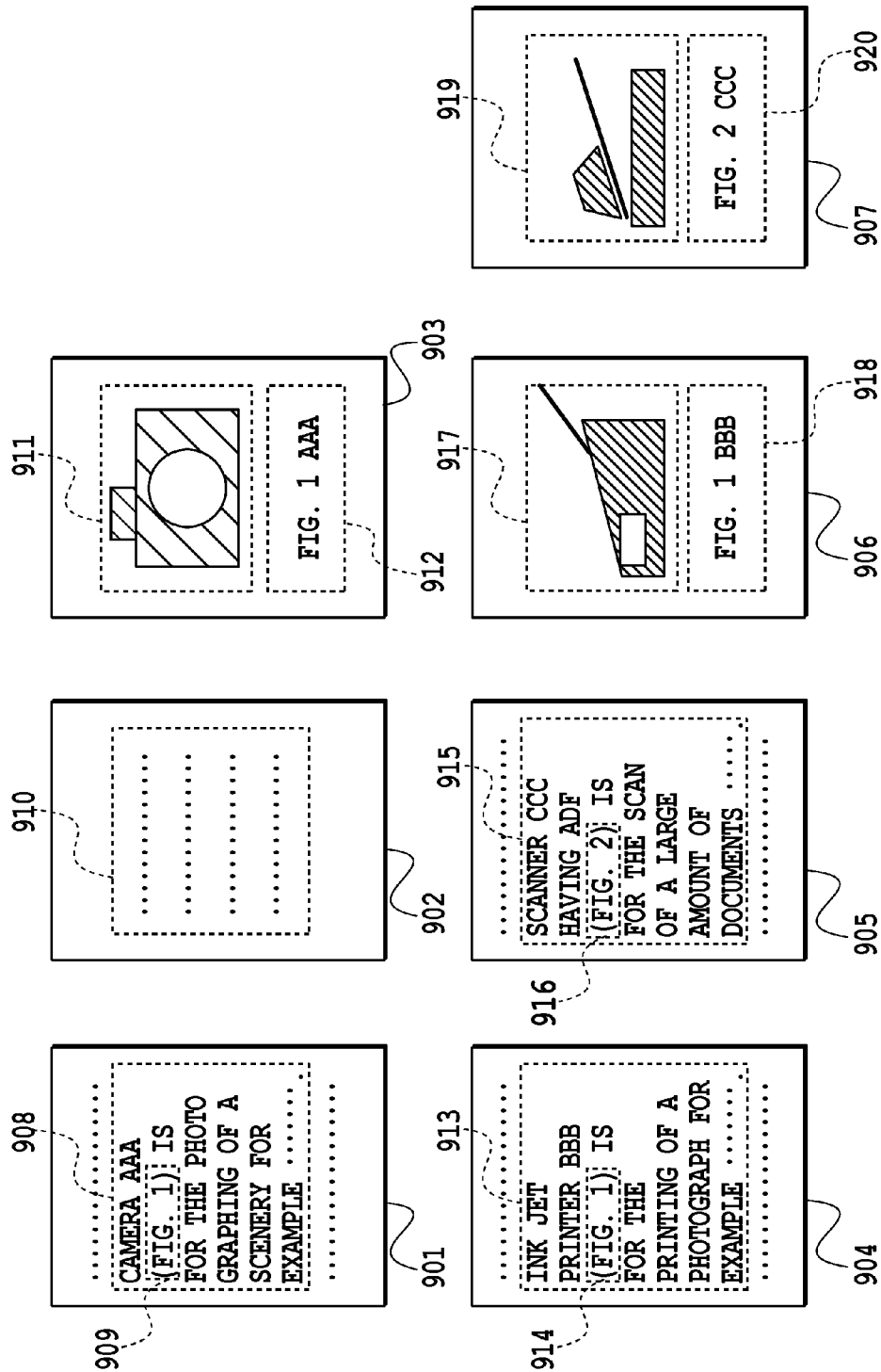

Next, the following section will describe the outline of the processing by an image processing apparatus (the MFP 100) according to this embodiment with reference to the flowchart of FIG. 7. The following description will be provided based on a case where electronic documents for which the respective objects are added with appropriate metadata are generated with regard to image data (901 to 903 and 904 to 907) shown in FIG. 9A corresponding to a total of seven pages composed of two different types of documents.

The processings in the respective steps, which will be described herein as the ones to be performed by the respective processing units, are realized by allowing the CPU 205 to read a computer program stored in the storage unit 211. However, the present invention is not limited to this. For example, the respective processing units also may be entirely or partially realized by hardware so that any of the respective units constituting the data processing unit 218 can be realized by hardware, such as an electronic circuit.

First, in Step 701, the CPU 205 reads the documents through the scanner unit 201 or reads the documents that were sent from the client PC 101, for example, and that are stored in the storage unit 211, to thereby acquire the image data for the plurality of pages. The acquired image data 901 to 907 is inputted to the data processing unit 218 and is sent from the metadata processing control unit 406 to the area division unit 301.

In Step 702, the area division unit 301 divides the inputted image data 901 to 907 on a page unit basis and based on the attributes thereof. The image data 901 to 907 is divided into the respective areas of 908, 910, 911, 912, 913, 915, 917, 918, 919, and 920.

In Step 703, the attribute information addition unit 302 adds attribute information to the respective areas divided in Step 702. For example, in the case of the image data 903 for the third page, to the area 911 is added a "photograph" attribute and to the area 912 is added a "caption" attribute. The caption 912 is also added with information showing that the accompanying area (object) is the area 911.

In Step 704, the character recognition unit 303 performs a character recognition processing on the areas to which a character-related attribute (e.g., body text, caption, heading, subheading) is added in Step 703 and associates the result as character recognition information to the areas, to thereby store the result into the storage unit 211. The character recognition processing results of the respective areas are as described in the spaces for the character recognition information in the table shown in FIG. 9B.

In Step 705, the data processing unit 218 determines whether all of the pages are subjected to the respective processings in Step 702 to 704 or not. Since the image data 901 to 907 corresponding to the seven pages is inputted, the completion of the processings to all of the pages can be determined when all of the pieces of information as shown in the table in FIG. 9B are all stored in the storage unit 211. When the completion of the processings to all of the pages is determined, the processing proceeds to Step 706. If any page not yet subjected to the processings is found, the processing returns to Step 702 and the above processings are repeated.

In Step 706, the metadata processing unit 304 performs a processing of extracting and adding metadata. The details of this processing will be described later.

In Step 707, the format conversion unit 305 uses the correspondence table as shown in FIG. 5C to convert, based on the respective pieces of information stored in the storage unit 211, the image data 901 to 907 to electronic documents having predetermined formats specified in advance.

(Extraction and Addition of Metadata)

Figure 8B:
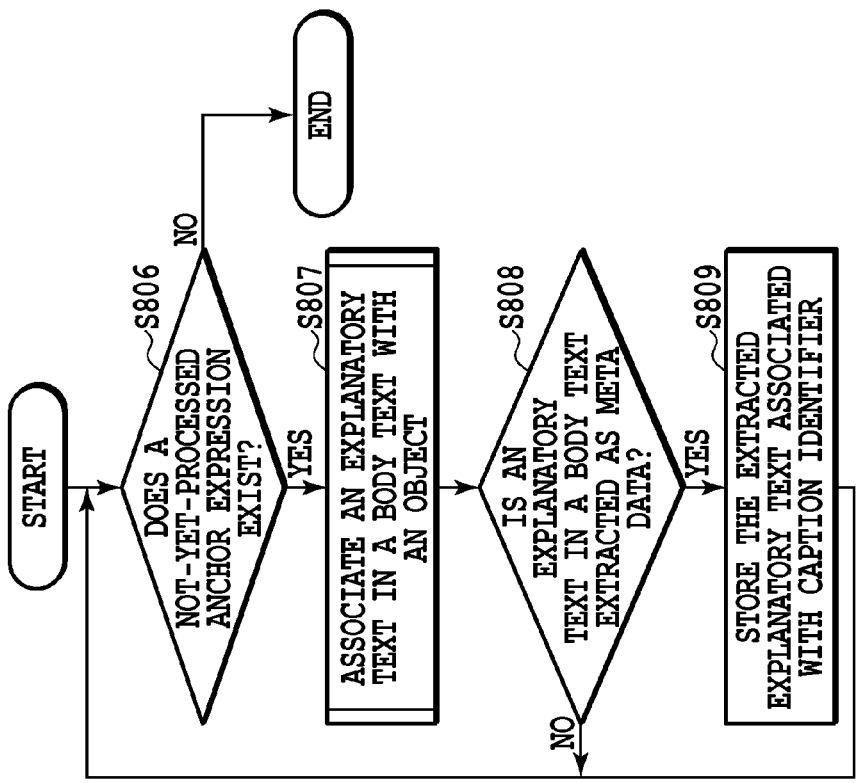
FIGS. 8A and 8B are flowcharts illustrating the flow of metadata extraction and addition processings.
Figure 8A:
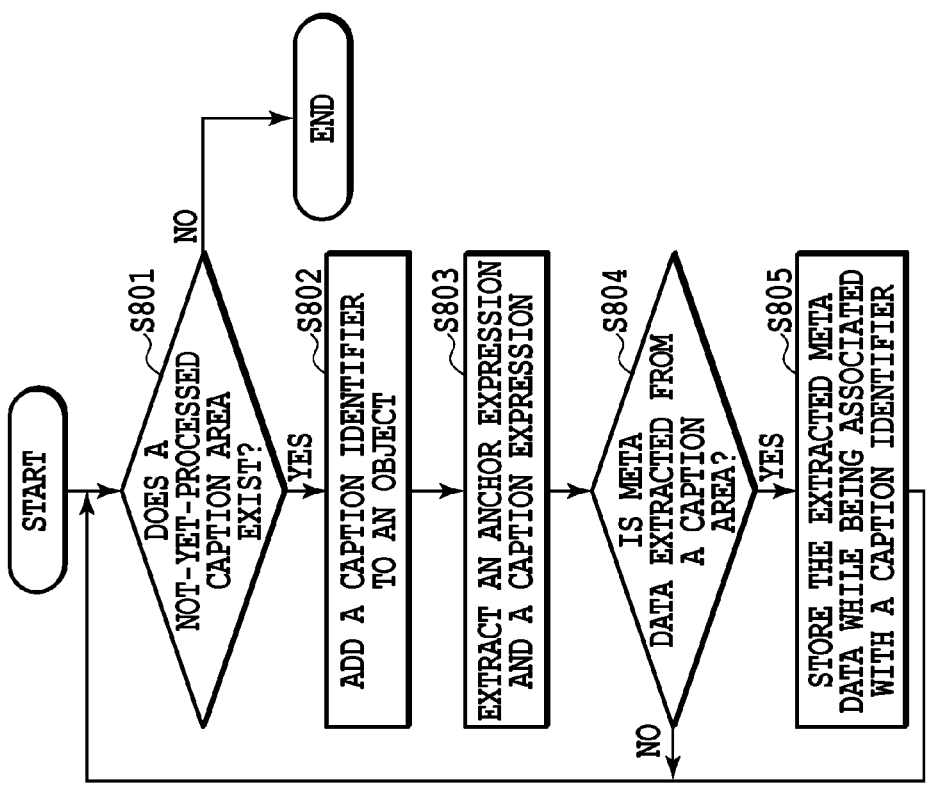

Next, the following section will describe the details of the processing of extracting and adding metadata in the above-described Step 706 with reference to the flowcharts of FIGS. 8A and 8B. This processing is mainly composed of the following two processings. The first processing is the first extraction for the extraction of an anchor expression and a caption expression (FIG. 8A). The second processing is the second extraction for the extraction of an explanatory text in a body text (FIG. 8B). The processing for the extraction of an anchor expression and a caption expression is first performed. Then, the processing for the extraction of an explanatory text in a body text is performed.

First, the following section will describe the processing for the extraction of an anchor expression and a caption expression with reference to the flowchart of FIG. 8A.

In Step 801, the metadata addition target selection unit 401 refers to area information in the storage unit 211 to select, from among areas to which has been added a "caption" attribute, one area that is not yet subjected to the processing for extracting an anchor expression and a caption expression. Specifically, whether there is a not-yet-processed caption area or not is determined. If there is a not-yet-processed caption area, the area is selected as a processing target. Then, the processing proceeds to Step 802. If there is no area having a "caption" attribute or if all areas are already subjected to the processing, then the processing for extracting an anchor expression and a caption expression is completed. In the case where image data 901 to 907 is inputted, the first routine selects a caption area 912 and the subsequent routines sequentially select caption regions 918 and 920.

In Step 802, the metadata processing control unit 406 adds a caption identifier to the selected object area accompanied by a caption area and secures, in the storage unit 211, a storage area for metadata for the added caption identifier. In the case where the caption 912 is selected, a caption identifier "1" is added to the photograph object 911 accompanied by the caption 912 and a storage area is secured in the storage unit 211 to store the metadata for the caption identifier "1".

In Step 803, the anchor expression extraction unit 902 extracts an anchor expression and a caption expression from the character recognition information of the selected caption area. A caption accompanying an object may include an anchor expression only, a caption expression only, or both of an anchor expression and a caption expression. For example, an anchor expression of a drawing is frequently expressed by a combination of a specific character string (anchor character string) such as "drawing", "Figure", or "Fig." and a number or a symbol. Thus, a dictionary is prepared in advance that includes registered anchor character strings as candidates. These candidates in the dictionary can be compared with the character recognition information to thereby identify an anchor expression (anchor character string+number/symbol). Then, among the character recognition information of the caption area, a character string not constituting an anchor expression is determined as a caption expression. For example, when the character recognition information of the caption area of the area 912 is composed of a character string of "Fig. 1 AAA", the "Fig. 1" part is an anchor expression and the "AAA" part is a caption expression. There may be a case where the caption expression has a very small number of characters or does not have a significant character string (e.g., a symbol string of "—"). In such a case, there is a possibility where a mark that is not a character, such as a boundary of a document, may be falsely recognized as a character string. Thus, this mark is not extracted as a caption expression.

In Step 804, the metadata processing control unit 406 determines whether an anchor expression and/or a caption expression is extracted in Step 803 from the caption area or not. Specifically, it is determined whether an anchor expression and a caption expression are extracted or not that function as metadata of an object to which has been added a caption identifier. When such an expression is extracted, the processing proceeds to Step 805. When such an expression is not extracted, the processing returns to Step 801.

In Step 805, the metadata processing control unit 406 stores, in the storage area for the metadata secured in Step 802, the metadata extracted from the caption area (an anchor expression or a caption expression or both of an anchor expression and a caption expression).

By the processings as described above, an extracted anchor expression for example is appropriately associated as metadata for a specific object via a caption identifier.

When the processing for extracting metadata by the extraction of an anchor expression and a caption expression is completed, then a processing for the extraction of an explanatory text in a body text is started.

The following section will describe the processing for the extraction of an explanatory text in a body text with reference to the flowchart of FIG. 8B.

In Step 806, the metadata processing control unit 406 selects one anchor expression not yet subjected to the processing for the extraction of an explanatory text in a body text. Specifically, the metadata processing control unit 406 determines whether there is a not-yet-processed anchor expression or not. If there is a not-yet-processed anchor expression, the anchor expression is selected. Then, the processing proceeds to Step 807. If there is no anchor expression or if all anchor expressions are already subjected to the processing, then the processing for the extraction of an explanatory text in a body text is completed. In the above example, "Fig. 1" is extracted as an anchor expression from the caption area 912. Thus, this anchor expression is first selected. Then, the processing proceeds to Step 807.

In Step 807, the metadata processing control unit 406 extracts a part including the extracted anchor expression (sentence) from the character recognition information for the body text area stored in the storage unit 211 to associate the extracted explanatory text in the body text as metadata to the object. In the above example, "Fig. 1" is extracted as an anchor expression. Thus, the body text area 908 of the image data 901 includes therein a word "Fig. 1" shown by the reference numeral 909. Since this word is identical with the anchor expression "Fig. 1", the body text area 908 is extracted as an explanatory text in a body text and is associated as the metadata of the photograph object 911.

The extracted body text area as an explanatory text in a body text also may be further subjected to an analysis to thereby extract metadata. For example, a morphological analysis for natural language processing, for example, may be used to separate words or the resultant word classes, or important words may be determined, for example, to thereby extract the word "camera" in the body text area 908 as metadata.

There is a possibility that a plurality of explanatory texts in a body text are extracted. There also may be a possibility that metadata is further obtained from an extracted explanatory text in a body text. Thus, this step may extract a plurality of pieces of metadata. When the processing for the extraction of an explanatory text in a body text is completed, then the processing proceeds to Step 808.

In Step 808, the metadata processing control unit 406 determines whether an explanatory text in a body text that functions as metadata of an object area added with a caption identifier is extracted or not. If such an explanatory text in a body is extracted, the processing proceeds to Step 809. If such an explanatory text in a body is not extracted, the processing returns to Step 806 and the processing is repeated for another not-yet-processed anchor expression.

In Step 809, the metadata processing control unit 406 stores (or adds), in the storage area for metadata secured in Step 802, the extracted explanatory text in a body text. After the storage, the processing returns to Step 806 to continue the processing of another not-yet-processed anchor expression.

By the processings as described above, the extracted explanatory text in a body text is appropriately associated as metadata for a specific object via a caption identifier.

When the processing of all anchor expressions is completed, the metadata collection/output unit 405 collects the resultant metadata and adds, to image data, metadata in the form of image data that can be received by the format conversion unit 305. Then, the image data added with the metadata is sent to the format conversion unit 305.

(Association Between an Explanatory Text in a Body Text and an Object)

Figure 10:
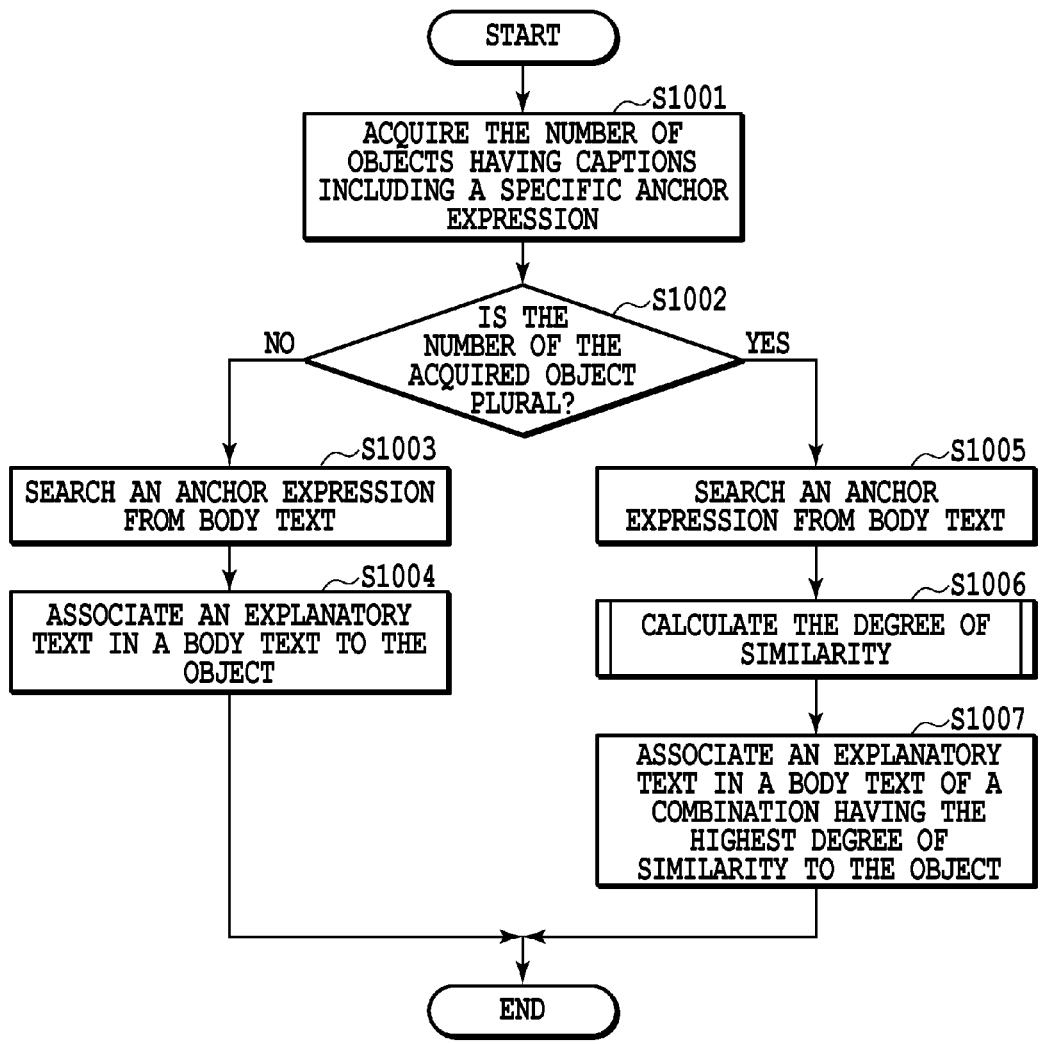
FIG. 10 is a flowchart illustrating the flow of the processing according to Embodiment 1 for associating an explanatory text in a body text to an object area.

Next, the following section will describe the details of the processing in Step 807 of FIG. 8B with reference to the flowchart of FIG. 10.

In Step 1001, the metadata processing control unit 406 acquires data indicating the number of objects having the caption including the specific anchor expression selected in Step 806 of FIG. 8B. A case is assumed where an anchor expression "Fig. 2" is selected for the image data 901 to 907 for example. In this case, there is no object including "Fig. 2" as the caption other than the photograph object 919. Thus, "1" is acquired as the number of objects. When an anchor expression "Fig. 1" is selected on the other hand, the photograph object 911 and the photograph object 917 exist as an object having a caption including "Fig. 1". Thus, "2" is selected as the number of object(s).

In Step 1002, the metadata processing control unit 406 determines whether the number of objects acquired in Step 1001 is plural or not. When the number of the acquired object is "1" (i.e., when there is no other object that has a caption including an identical anchor expression anymore), the processing proceeds to Step 1003. When the number of the acquired objects is plural (i.e., when captions of a plurality of objects use an identical anchor expression), the processing proceeds to Step 1005.

In Step 1003, the in-body text search unit 403 searches the specific anchor expression in the character recognition information of the body text area. In the case of the above example, the body text area 915 including the anchor expression 916 of "Fig. 2" is extracted as an explanatory text in a body text. When an expression including the anchor expression is found in the character recognition information of the body text area, the processing proceeds to Step 1004.

In Step 1004, the metadata processing control unit 406 associates the expression in the body text including the specific anchor expression (an explanatory text in a body text) to the object. In the case of the above example, the body text in the body text area area 915, extracted as an explanatory text in the body text including the anchor expression "Fig. 2," is associated to the photograph object 919.

In Step 1005, the in-body text search unit 403 searches, as in Step 1003, the specific anchor expression in the character recognition information of the body text area. In the case of the above example, the body text areas 908 and 913 are found as an explanatory text in a body text including the anchor expression "Fig. 1". When an explanatory text in a body text including the specific anchor expression is found in the character recognition information of the body text area as described above, the processing proceeds to Step 1006.

In Step 1006, the metadata processing control unit 406 prepares, with regard to the found explanatory text in a body text (body text area), a required number of combinations for finding an optimal correspondence relation with a caption of a possible object area. Then, the degree of similarity is calculated with regard to the individual combinations. In the case of the above example, two combinations are prepared between the captions 912 and 918 including the identical anchor expression of "Fig. 1" and the body text areas 908 and 913 including the anchor expression, for example. Specifically, in this case, if a caption corresponding to one explanatory text in a body text is determined, the other is also determined. Thus, two combinations of a combination of the caption 912 and the body text area 908 and a combination of the caption 918 and the body text area 908 are prepared. Alternatively, other corresponding two combinations also may be prepared that are a combination of the caption 912 and the body text area 913 and a combination of the caption 918 and the body text area 913. If three captions (objects) including an identical anchor expression and three explanatory texts in a body text that may correspond to the captions are found, at least five combinations are calculated.

The details of the calculation of the degree of similarity will be described later. After the completion of the calculation of the degree of similarity, the processing proceeds to Step 1007.

In Step 1007, the metadata processing control unit 406 assumes, based on the calculation result in Step 1006, that a combination having the highest value of the degree of similarity is optimal. Then, the metadata processing control unit 406 associates an explanatory text in a body text in this combination to the object area.

(Processing for Calculating the Degree of Similarity)

The calculation of the degree of similarity in Step 1006 of FIG. 10 will be described with reference to the flowchart of FIG. 11 with regard to the example of the above-described two combinations (the first combination of a caption 912 and a body text area 908 and the second combination of the caption 918 and the body text area 908).

In Step 1101, the expression similarity degree calculation unit 404 acquires a caption expression from the caption of the combination of calculation targets. When the first combination is a calculation target "AAA", obtained by removing the anchor expression "Fig. 1" from the caption 912 is acquired as a caption expression. After the acquisition, the processing proceeds to Step 1102.

In Step 1102, the expression similarity degree calculation unit 404 subjects the acquired caption expression to a word separation by a morphological analysis to thereby obtain the word class information regarding the respective words. Then, based on the obtained word class information, a word having a word class such as a noun (hereinafter referred to as "caption word") is selected as a comparison target. Specifically, a word or an anchor expression that is not important is excluded from comparison targets so that such a word or anchor is not selected. For example, the caption expression "AAA" provides one noun "AAA". A caption word of "AAA" and a word class information "noun" are obtained. As a result, "AAA" is selected as a comparison target candidate. In this step, a plurality of caption words may be selected.

In Step 1103, the expression similarity degree calculation unit 404 sets the weight for the caption word to 1. Specifically, in this embodiment, the weight value is not calculated based on the distance from the anchor expression or the word class or characteristic of the word for example. However, the value obtained through the calculation as described above also may be used as a weight when the caption expression is a sentence having a certain length or when the importance of the word is calculated based on a unique expression extraction or a dictionary for example.

FIG. 12A illustrates, by a table, the result of the first combination obtained through the processings as described above. In this table, the caption expression and the caption word are "AAA", the caption word attribute is "noun", and a comparison target candidate is selected. The distance information from the anchor expression is set to information of "−" that shows that this distance information is not used. The weight is set to "1".

Next, in Step 1104, the expression similarity degree calculation unit 404 acquires an explanatory text in a body text (body text area) in the combination of calculation targets. In the case of the first combination, the body text area 908 is acquired as the explanatory text in a body text of "camera AAA (FIG. 1) is for the photographing of a scenery for example" including the anchor expression 909 of "Fig. 1".

In Step 1105, the expression similarity degree calculation unit 404 subjects the acquired explanatory text in the body text to a word separation by a morphological analysis to thereby obtain the word class information for the respective words. Then, based on the obtained word class information, a word having a word class such as a noun (hereinafter referred to as "explanatory text word") is selected as a comparison target. This selection is also carried out so that a not-important word or anchor expression is excluded from comparison targets and is not selected. In this step, a plurality of explanatory text words are selected.

In Step 1106, the expression similarity degree calculation unit 404 arranges the selected explanatory text words in an order of the ones having a closer position in the explanatory text in the body text to the anchor expression (i.e., in an order of the ones having a shorter distance (word distance) from the anchor expression). The distance from the anchor expression is simply set as the number of words from the anchor expression to the explanatory text word. Hereinafter, a column of explanatory text words arranged in an order of the word distance will be called as an "explanatory text word string". Then, the number of explanatory text words included in this explanatory text word string is set as the value of the variable N.

FIG. 12B illustrates, by a table, the result of the processings of Steps 1105 and 1106 to the acquired explanatory text in the body text of "camera AAA (FIG. 1) is for the photographing of a scenery for example". The three explanatory text words are selected as comparison target candidates and are given with values "3", "2", and "1", respectively, as an order in the explanatory text word string so that these words can be extracted in an order of the ones having a shorter distance to the anchor expression "Fig. 1" (i.e., in an order of "AAA", "camera", and "scenery"). In this case, the number of the explanatory text words included in the explanatory text word string is three. Thus, the value of the variable N is set to "3".

In Step 1107, the expression similarity degree calculation unit 404 initializes the value of the variable S showing the degree of similarity. Specifically, the expression similarity degree calculation unit 404 sets the predetermined value as the degree of similarity S to "0".

In Step 1108, the expression similarity degree calculation unit 404 determines whether the value of the variable N is higher than "0" or not. When the variable N is higher than "0", it means that there is an explanatory text word that is a not-yet-processed comparison target. Thus, the processing proceeds to Step 1109. When the value of the variable N is "0", it means that all of explanatory text words as a comparison target are already subjected to the processing. Thus, a routine composed of Step 1108 to Step 1113 is performed and the processing is completed.

In Step 1109, the expression similarity degree calculation unit 404 extracts, from the explanatory text word string, such an explanatory text word that has an order in the explanatory text word string having the same value as that of the variable N. In the case of the above example, the explanatory text word "AAA" having the order of the explanatory text word string of "3" is firstly extracted.

In Step 1110, the expression similarity degree calculation unit 404 calculates the weight of the explanatory text word based on the word distance showing the distance from the anchor expression. The weight has an attenuating value, depending on the word distance and has the highest value of "1" and the lowest value of "0". The weight is an inverse number of the word distance in this example. In the case of the explanatory text word "AAA", the word distance thereof is "2". Thus, "0.5" is calculated as a weight. The weight also can be obtained by various methods other than the above method including a method of attenuating the weight in a linear manner, a method of using a logarithm, or a method of using a distribution function for example. However, any method also can be used so long as the method provides the attenuation of the weight depending on the distance.

In Step 1111, the expression similarity degree calculation unit 404 compares the selected explanatory text word with the caption word to calculate the degree of similarity S. Specifically, as shown in the following formula 1, when the former word and the latter word have the same character string, the degree of similarity S is calculated by multiplying "1" with the weights of the former and latter words. When the former word and the latter word have different character strings, the degree of similarity S is calculated by multiplying "0" with the weights of the former and latter words.

Degree of similarity $S=(1 \text{ or } 0)\times(\text{weight of caption word})\times(\text{weight explanatory text word})$ (Formula 1)

In this manner, the degree of similarity S is calculated with regard to the explanatory text word as a comparison target. When there are a plurality of caption words, the caption words are individually compared with a selected explanatory text word. Then, the degree of similarity S having the highest value among the calculated degree of similarities S is determined as Smax.

In this embodiment, the degree of similarity S is obtained through a simple calculation. However, the degree of similarity S also can be obtained by such a comparison that considers a thesaurus, an inconsistent notation, or a notation such as Hiragana, Katakana, or Kanji for example. The degree of similarity S also can be obtained by a comparison using a thesaurus or a comparison using a comparison language for determining the ambiguity based on the context. The degree of similarity S also can be obtained by considering the inclusion rate of a character string or a rate at which the same character is mixed for example.

Next, in Step 1112, the expression similarity degree calculation unit 404 adds the value of the degree of similarity S (or Smax) calculated in Step 1111 to the values of the preceding degree of similarity S to thereby update the value of the degree of similarity S. In the case of the first routine for example, the initial value is set to "0". Thus, the value of the degree of similarity S calculated in Step 1111 is directly used as an updated degree of similarity S. In the case of the second and subsequent routines, the value of the degree of similarity S obtained through the preceding routine(s) is added with the value of the latest determined degree of similarity S (or Smax).

In Step 1113, the expression similarity degree calculation unit 904 deducts 1 (one) from the value of variable N. Then, the processing returns to Step 1108.

In the example of FIG. 12B, there are three explanatory text words as a comparison target candidate. Thus, the above routine is repeated three times.

In the first routine, the value of the variable N is set to "3". Thus, the determination in Step 1108 is followed by Step 1109. In Steps 1109 and 1110, the extraction of "AAA" is followed by the calculation of "0.5" as a weight for the word as described above. Then, in Step 1111, a processing is performed to calculate the degree of similarity S between the explanatory text word "AAA" and the caption word "AAA". In this case, the former and latter words have the same character string. Thus, the degree of similarity S is calculated as 1×1×0.5.

Since there is only one caption word "AAA", the resultant degree of similarity S=0.5 is added to the initial value "0" in Step 1112. Then, the processing proceeds to Step 1113. In Step 1113, 1 (one) is deducted from the value of the variable N to result in N="2". Then, the processing returns to Step 1108. Thereafter, the same processing is repeated two times. The degree of similarity S is also calculated between the explanatory text words "camera" and "scenery" and then the degree of similarity S is always updated. However, since the explanatory text words "camera" and "scenery" are different from the only caption word "AAA", the value of the degree of similarity S calculated in Step 1111 is "0" for both of the explanatory text words "camera" and "scenery". Therefore, the finally-obtained value of the degree of similarity S is 0.5+0+0=0.5.

As described above, the processing for the first combination has been described. A similar processing is also performed on the second combination composed of the caption 918 and the body text area 908. In the case of the second combination, the caption expression obtained from the caption 918 is "BBB". Thus, the caption expression is different from the explanatory text word. Thus, the finally-obtained degree of similarity S has a value of 0. As a result, in Step 1007 of FIG. 10, the metadata processing control unit 406 assumes that the first combination having the degree of similarity S of 0.5 is an optimal combination. Specifically, the photograph object 911 having the caption 912 according to the first combination is associated to the explanatory text in the body text of "camera AAA (FIG. 1) is for the photographing of a scenery for example" (the body text area 908).

Figure 11:
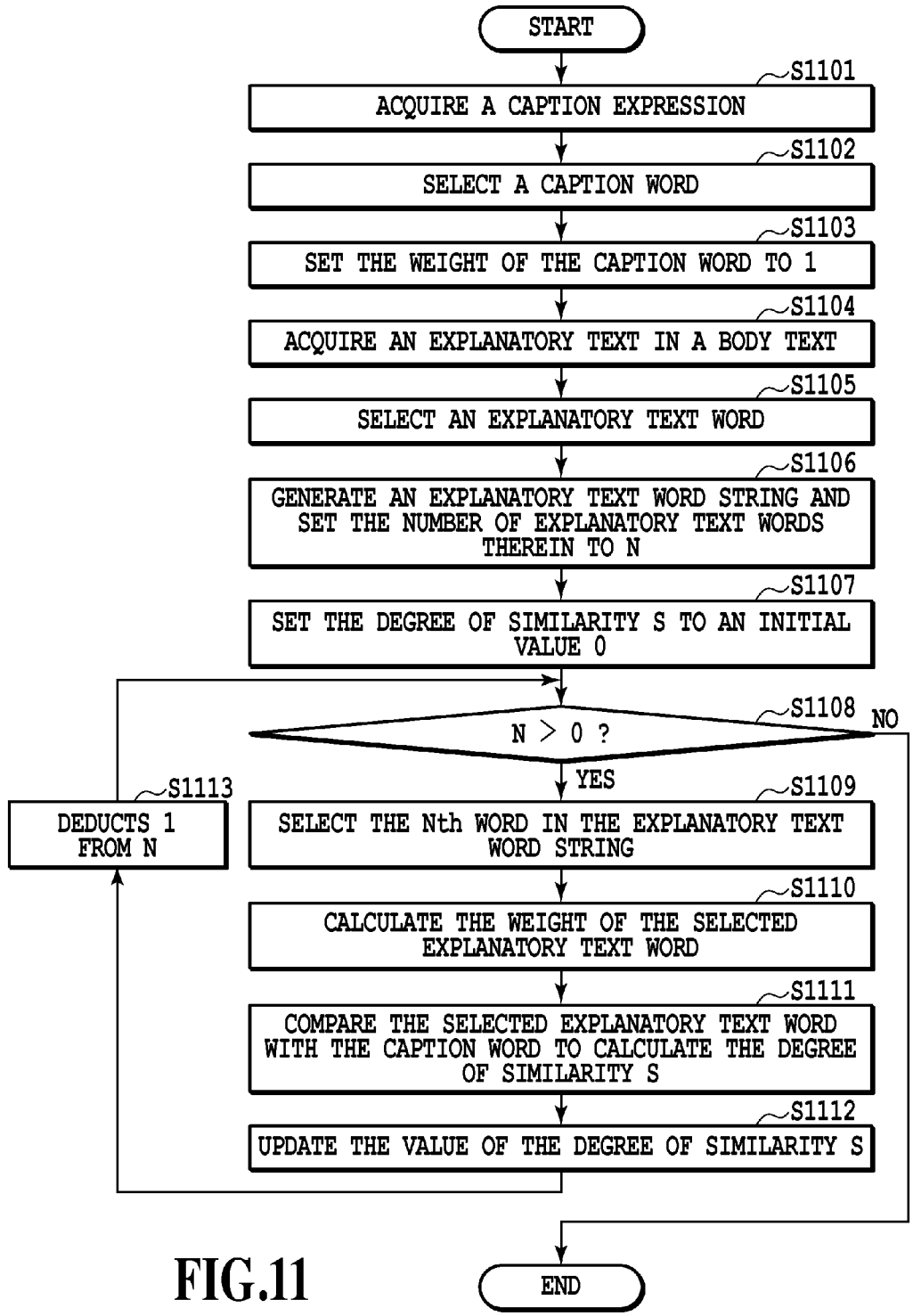
FIG. 11 is a flowchart illustrating the flow of a processing for calculating the degree of similarity according to Embodiment 1.

Instead of the method shown in the flowchart of FIG. 11, other methods also can be used, such as a method of using a rate at which the same character is used, a degree at which the same character is continuously used, or a method of extracting only an important expression to thereby obtain a specific expression (character string) for comparison for example.

FIG. 13 illustrates, by a table, the metadata information obtained through the processing as described above performed on the image data 901 to 907.

For example, as shown by the reference numeral 1301, the explanatory text in the body text of the body text area 908, the caption 912, and the anchor expression thereof of "Fig. 1" are appropriately associated by the caption identifier "1" to the photograph object 911. As shown by the reference numeral 1302, the explanatory text in the body text of the body text area 913, the caption 918, and the anchor expression thereof "Fig. 1" are also appropriately associated by the caption identifier "2" to the photograph object 917. As shown by the reference numeral 1303, the explanatory text of the body text of the body text area 915, the caption 920, and the anchor expression thereof of "Fig. 2" are appropriately associated by the caption identifier "3" to the photograph object 919.

The metadata information shown in the table in FIG. 13 is described, in an actual case, by the SVG format for example. The metadata information can be described by the same method as that described for FIG. 6A. Specifically, in FIG. 6A, the caption identifier 608 is added to the object data 603 and the same identifier is added as the caption identifier 609 to the metadata 607 of the object. Similarly in FIG. 13, the same identifier as the caption identifiers (1 to 3) added to the respective objects is added to the metadata corresponding to the respective objects so that metadata corresponding to each object can be identified.

As described above, in the image processing apparatus according to this embodiment, an object in a document such as a photograph, a drawing, or a table can be appropriately associated to an explanatory text in a body text describing the contents thereof. As a result, even when a specific anchor expression is commonly used in the captions in different objects of different documents, electronic document data to which is added appropriate metadata can be prepared with regard to the respective objects. Furthermore, metadata can be extracted while significantly reducing the influence by the page layout or the distance between pages. Thus, appropriate metadata can be added even out of image data that has randomly-arranged pages.

Embodiment 2

Figure 14A:
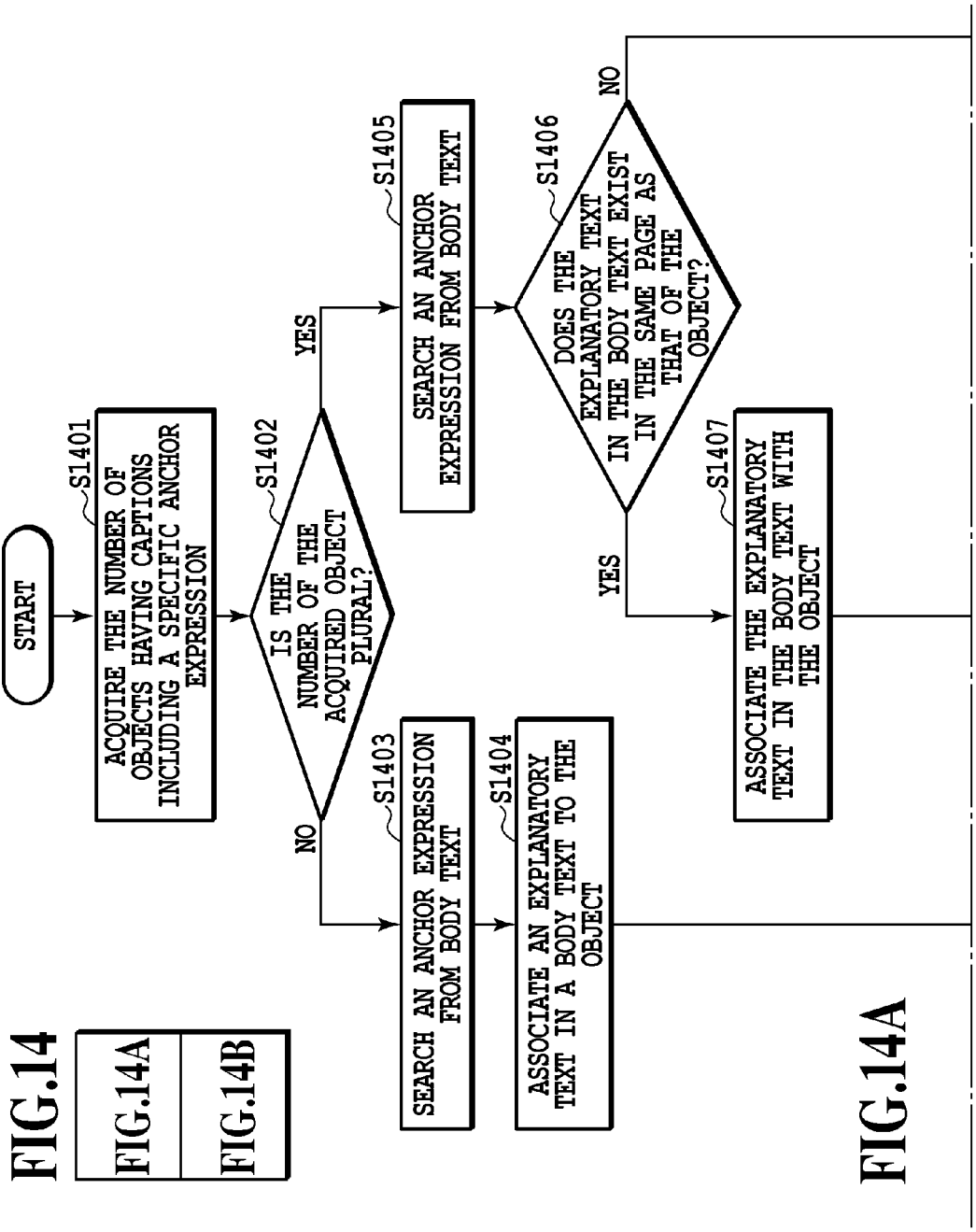
FIGS. 14A and 14B are flowcharts illustrating the flow of the processing according to Embodiment 2 for associating an explanatory text in a body text to an object area.
Figure 14B:
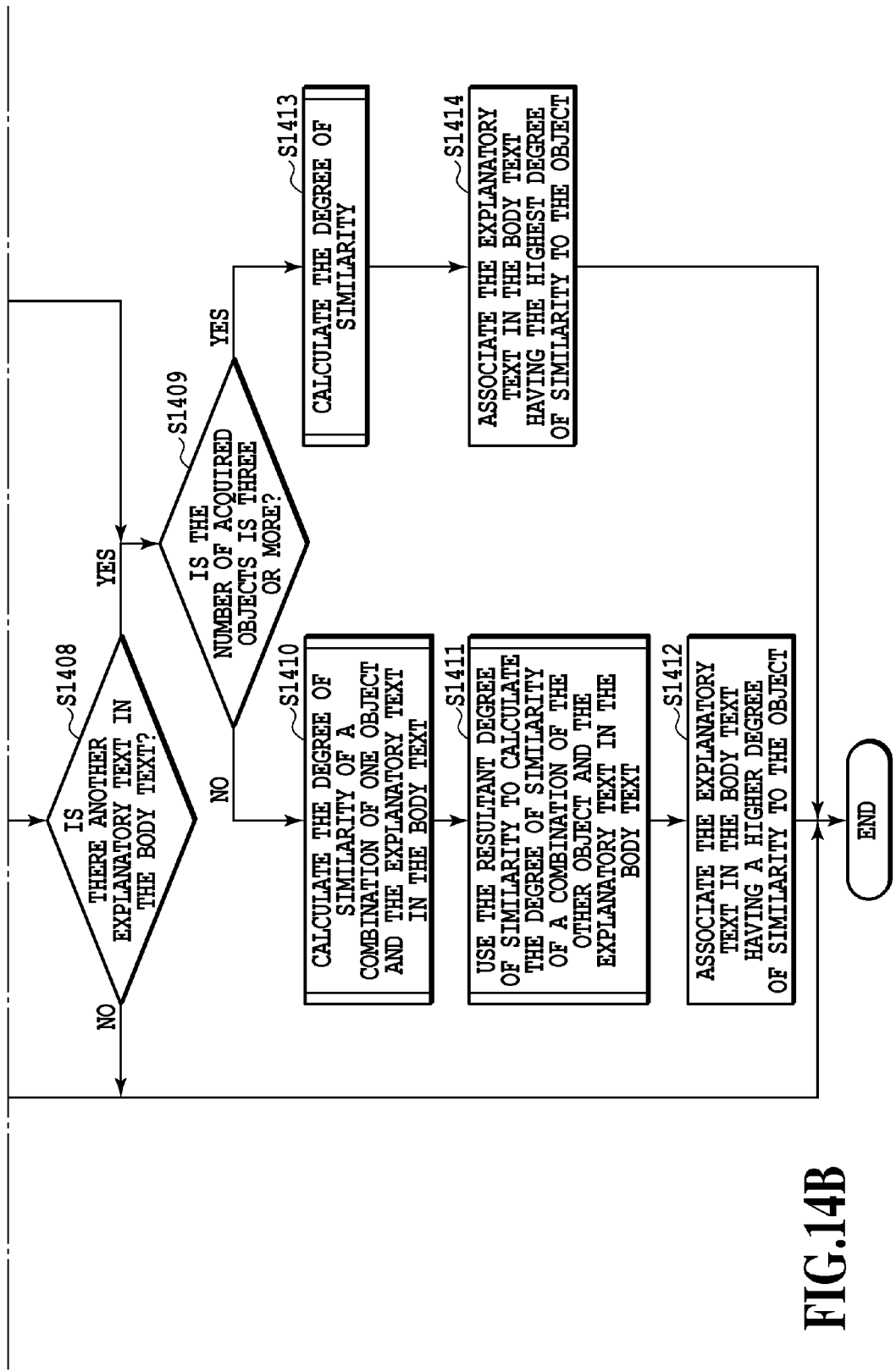
Figure 15:
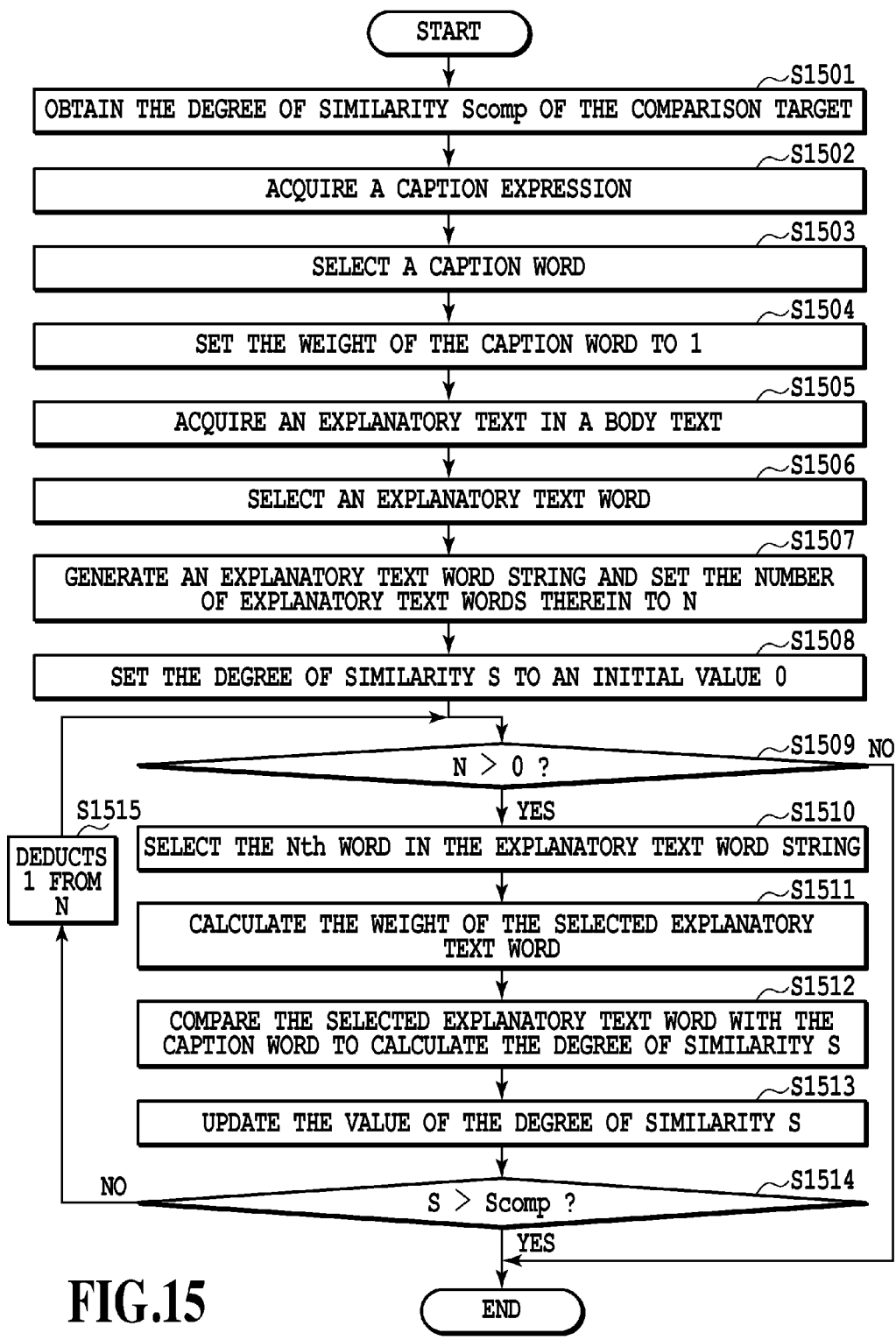
FIG. 15 is a flowchart illustrating the flow of the processing according to Embodiment 2 for calculating the degree of similarity.

Next, the following section will describe Embodiment 2 of the processing in Step 807 of FIG. 8B with reference to FIGS. 14A, 14B and FIG. 15. Embodiment 2 is an embodiment that can improve the efficiency of the processing for extracting an explanatory text in a body text including a selected anchor expression to associate the extracted text to an object area.

FIGS. 14A and 14B are flowchart illustrating the processing for associating an explanatory text in a body text to an object area in this embodiment. The same parts as those of the flowchart of FIG. 10 according to Embodiment 1 will be simply described or will not be described further. Thus, a different point will be mainly described.

In Step 1401, data representing the number of objects having a caption including a specific anchor expression is acquired. When the number of the acquired objects is plural in Step 1402, the processing proceeds to Step 1405. When the number of the object is "1", the subsequent processings (S1403 and S1404) are the same as Steps S1003 and S1004 of FIG. 10.

In Step 1405, the metadata processing control unit 406 searches the anchor expression in the body text area. In Step 1406, the metadata processing control unit 406 determines whether the resultant explanatory text in the body text exists in the same page as that of the object, such as a photograph. In the case of image data for the respective pages obtained by reading these pages by a scanner, it is rare that data of one page is mixed with image data of another document. Thus, when an object such as a photograph exists in the same page as that of an explanatory text in a body text found through the search, it is considered that the object and the explanatory text have a correspondence relation therebetween. Thus, this determination processing is performed so that the association can be performed without calculating the degree of similarity. When the object such as a photograph is determined as existing in the same page as that of the explanatory text in a body text, the processing proceeds to Step 1407. In Step 1407, the metadata processing control unit 406 associates the explanatory text in a body text including the anchor expression to the object area in the same page. Thereafter, the processing proceeds to Step 1409. When the object, such as a photograph, is determined as not existing in the same page as that of the explanatory text in a body text, the processing proceeds to Step 1408.

In Step 1408, the metadata processing control unit 406 determines whether there are other explanatory texts in a body text found through the search or not. Specifically, the metadata processing control unit 406 determines whether there is a combination of an object area and an explanatory text in a body text for which the degree of similarity must be calculated. If it is determined that there is no explanatory text in a body text anymore, this processing is completed. If there is another explanatory text in a body text, then the processing proceeds to Step 1409.

In Step 1409, the metadata processing control unit 406 determines whether or not the number of the objects acquired in Step 1401 is 3 or more. When the number of the objects is 2, the processing proceeds to Step 1410. When the number of the objects is 3 or more, the processing proceeds to Step 1413. The processings in Step 1413 and Step 1414 when the number of the objects is 3 or more are the same as those of Step 1006 and Step 1007 of FIG. 10.

In Step 1410, the expression similarity degree calculation unit 404 subjects the combination of one object area and the explanatory text in a body text to the above-described processing of the flowchart of FIG. 11 to thereby calculate the degree of similarity S.

Next, in Step 1411, the expression similarity degree calculation unit 404 uses the degree of similarity S obtained in Step 1410 to subject a combination of the other object area and the explanatory text in a body text to the processings shown by the flowchart of FIG. 15. Specifically, the following processings are performed.

First, in Step 1501, the expression similarity degree calculation unit 404 acquires the degree of similarity S obtained in Step 1410 to retain this degree of similarity S in the RAM 206 as the degree of similarity Scomp used as a comparison target in Step 1514 described later. Then, the processing proceeds to Step 1502.

In Step 1502 to Step 1513, the same processings as those of Step 1101 to Step 1112 of FIG. 11, respectively, are performed. When a processing for the first update of the degree of similarity S is performed in Step 1513, the processing proceeds to Step 1514.

In Step 1514, the expression similarity degree calculation unit 404 compares the value Scomp acquired and retained in Step 1501 with the value of the degree of similarity S updated in Step 1513 to determine which of the two values is higher. When the value of the updated degree of similarity S is higher than Scomp, the processing is completed. Then, the processing proceeds to Step 1412. The reason is that it is fixed that the acquired degree of similarity S (Scomp) is lower than the degree of similarity S in Step 1410. When the value of the updated degree of similarity S is smaller than the value Scamp, the processing proceeds to Step 1515 to perform the second routine to calculate the degree of similarity S.

When the value of the variable N is 0 in the second and subsequent routines without determining that the value of the updated degree of similarity S is higher than Scomp, the processing is completed. Then, the processing proceeds to Step 1412. At this point of time, it is fixed that the acquired degree of similarity S (Scomp) acquired in Step 1410 is higher than the degree of similarity S acquired in Step 1411.

Then, in Step 1412, the metadata processing control unit 406 associates the explanatory text in a body text in the combination having a higher value of the degree of similarity S to the object area.

As described above, according to this embodiment, a part of the processings can be omitted depending on whether or not the object, such as a photograph, and the explanatory text in a body text exist in the same page and whether the number of the objects is 3 or more. Thus, the processings can be performed at a higher speed.

Embodiment 3

In Embodiment 1 and Embodiment 2, an object area, such as a photograph, is associated to an explanatory text in a body text only based on whether the calculated value of the degree of similarity is higher or lower. The following section will describe an embodiment in which, after the calculation of the degree of similarity, it is determined whether the calculated value of the degree of similarity reaches a predetermined threshold value or not. Only when the calculated value of the degree of similarity reaches the predetermined threshold value, the object area is associated to the explanatory text in a body text.

Figure 16:
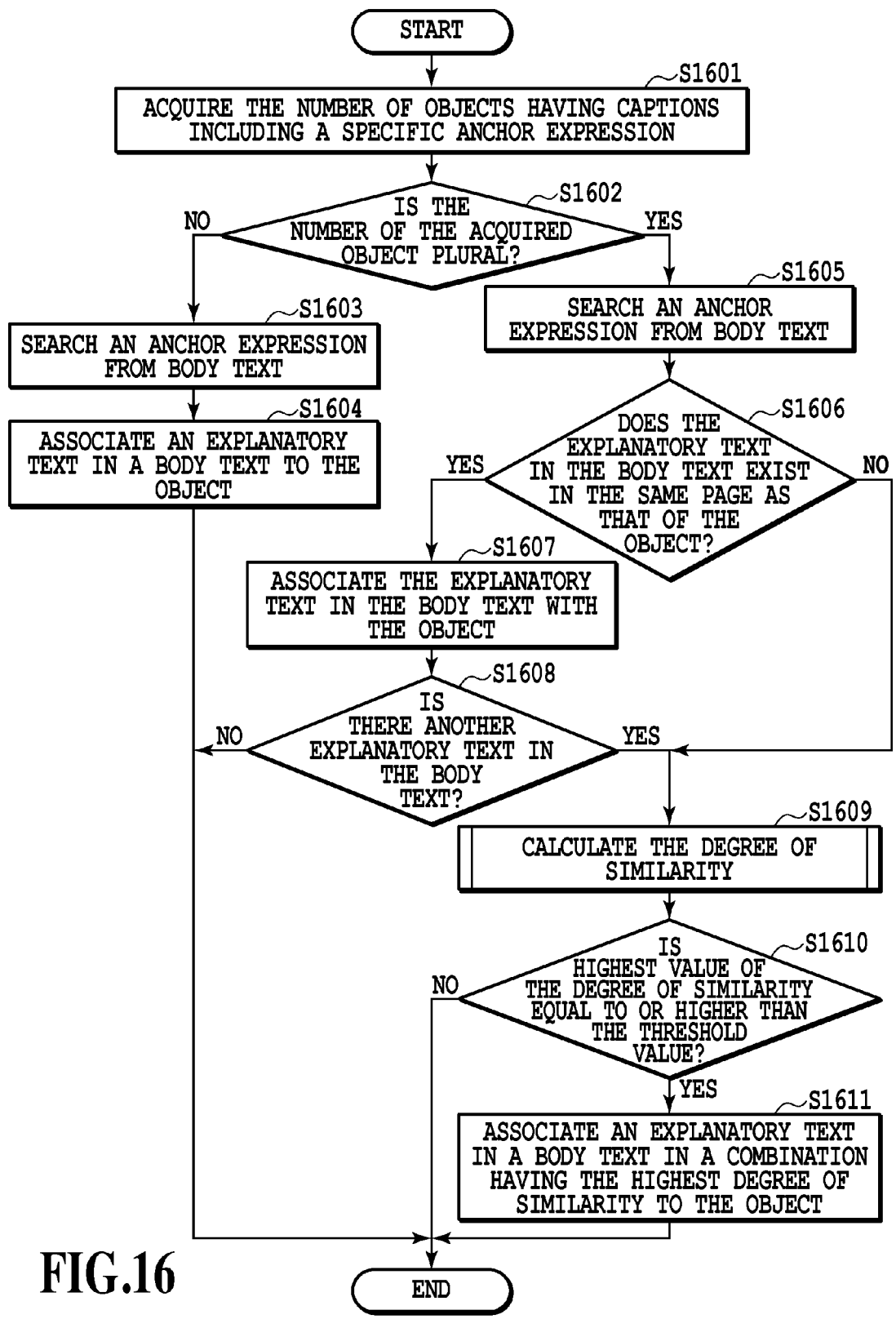
FIG. 16 is a flowchart illustrating the flow of the processing according to Embodiment 3 for associating an explanatory text in a body text to an object area.

FIG. 16 is a flowchart illustrating the flow of the processing according to this embodiment to associate an explanatory text in a body text to an object area. The flowchart of FIG. 16 corresponds to the flowchart of FIG. 10 of Embodiment 1 and the flowchart of FIGS. 14A and 14B of Embodiment 2. Thus, common parts therebetween will be described simply or will not be described further. Thus, a different point will be mainly described.

The processings of Step 1601 to Step 1608 are the same as the processings of Step 1401 to Step 1408 of FIGS. 14A and 14B, respectively. The processing of Step 1609 is the same as the processing of Step 1006 of FIG. 10. When degrees of similarity of combinations are calculated in Step 1609, the processing proceeds to Step 1610.

In Step 1610, the expression similarity degree calculation unit 404 compares the value of the highest degree of similarity with a predetermined threshold value set in advance to determine whether the value of the degree of similarity is equal to or higher than the threshold value or not. When the value of the degree of similarity is equal to or higher than the threshold value, the processing proceeds to Step 1611 to associate an explanatory text in a body text to an object area. When the value of the degree of similarity does not reach the threshold value, the explanatory text in the body text is not associated to the object area and the processing is completed.

Figure 17:
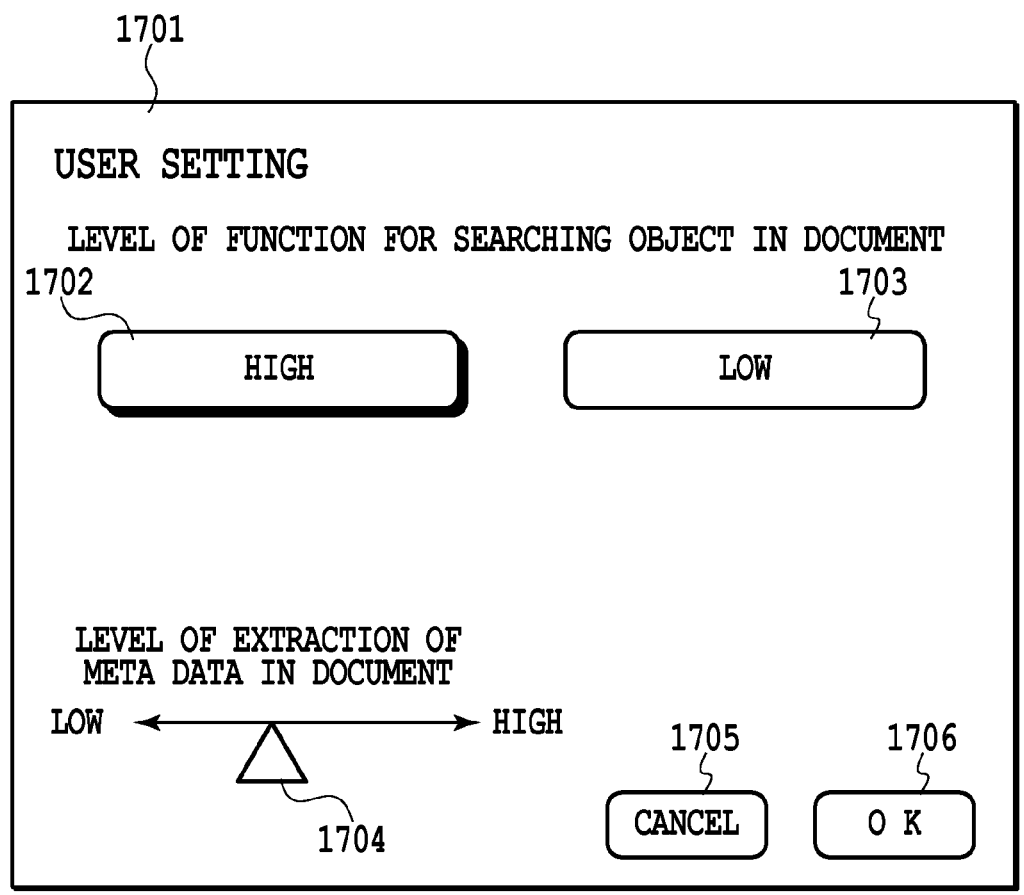
FIG. 17 illustrates an example of the user interface (UI) screen displayed on an operation unit 203.

FIG. 17 illustrates an example of the user interface (UI) screen displayed on the operation unit 203 of the MFP 100. The UI screen 1701 has thereon buttons 1702 and 1703 for specifying the level of the function for searching an object in a document, such as a photograph, a drawing, or a table. When the button 1702 is selected, an electronic document is prepared by a method having a superior object search function (i.e., the method according to the present invention). When the button 1703 is selected, an electronic document is prepared by a conventional method prioritizing the compression of a file size. The reference numeral 1704 denotes a button for allowing a user to set the above-described threshold value to an arbitrary value. In order to increase the level of the extraction of metadata in a document, the button 1704 is slid to the right side. This consequently reduces the threshold value to thereby extract more metadata. In order to reduce the level of the extraction of metadata in the document on the other hand, the button 1704 is slid to the left side. This consequently increases the threshold value to thereby extract less metadata. Through this user interface, the user can change the threshold value arbitrarily to change the level of the extraction of metadata to a desired level. The reference numeral 1705 denotes a cancel button for canceling the selected contents. The reference numeral 1706 denotes an OK button for fixing the set contents.

According to this embodiment, the case where the value of the degree of similarity is lower than the threshold value is assumed as the case where correct metadata may not be extracted to thereby prevent metadata from being added. This can consequently prevent a circumstance where a wrong association of an explanatory text in a body text to an object area causes the addition of wrong metadata. Thus, the subsequent object search can be performed correctly.

Embodiment 4

Next, Embodiment 4 will be described where, when it is found that there are a plurality of objects having a caption including a specific anchor expression, the existence is warned to the user by a warning display.

Figure 18:
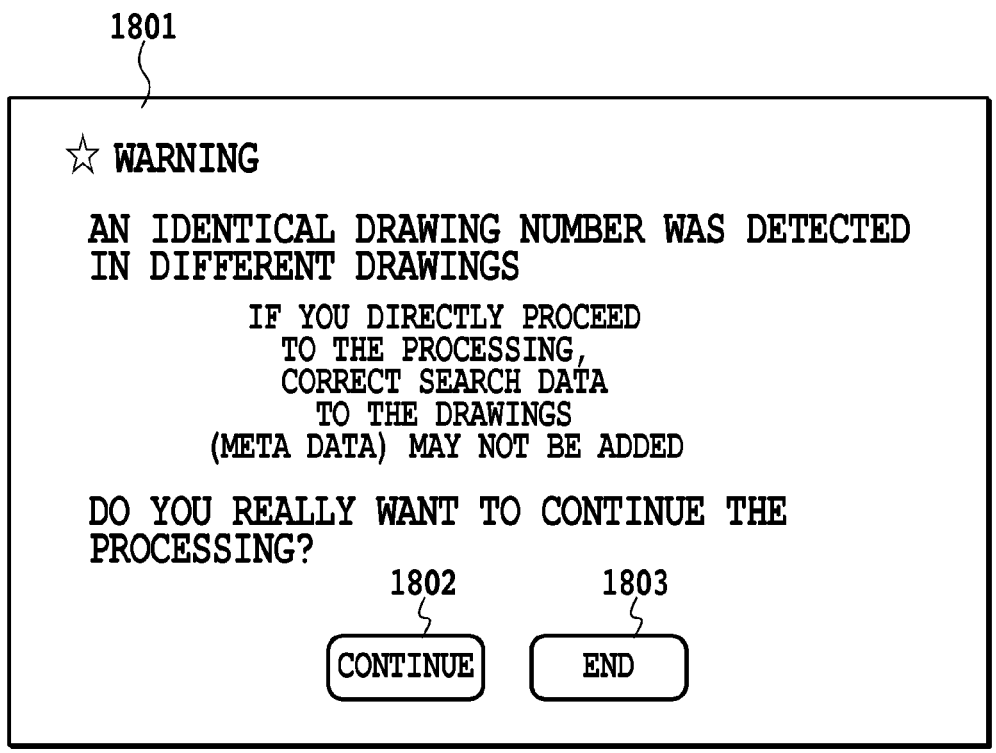
FIG. 18 illustrates an example of the warning screen displayed on the operation unit 203.
Figure 19:
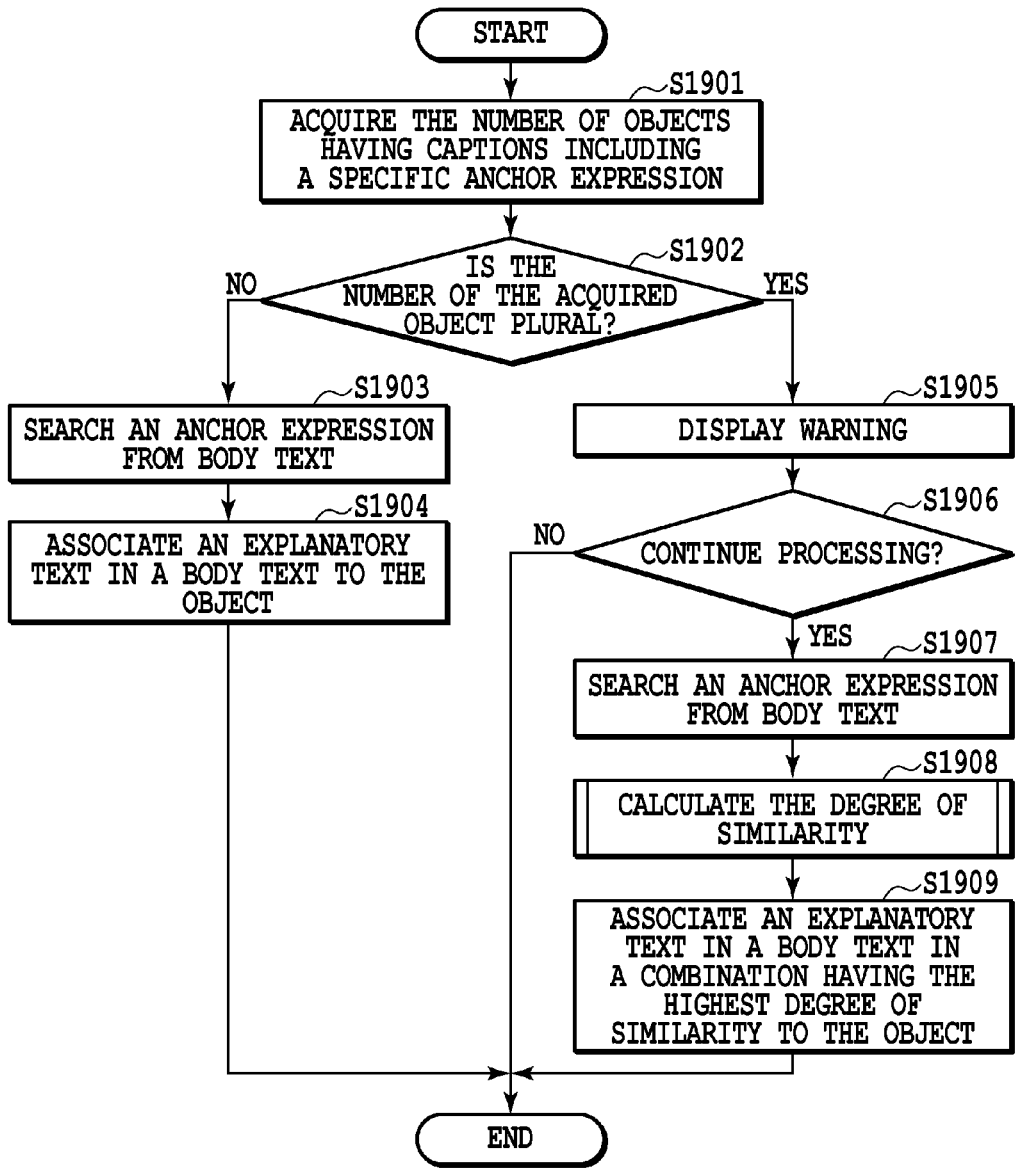
FIG. 19 is a flowchart illustrating the flow of the processing according to Embodiment 4 for associating an explanatory text in a body text with an object.

FIG. 18 illustrates an example of a warning screen displayed on the operation unit 203 of the MFP 100 in this embodiment. FIG. 19 is a flowchart of the flow of the processing according to this embodiment for associating an explanatory text in a body text to an object area. The same parts as those of the flowchart of FIG. 10 according to Embodiment 1 will be simply described or will not be described further. Thus, a different point will be mainly described.

In Step 1901, the number of objects having a caption including a specific anchor expression is acquired. When it is determined in Step 1902 that the number of the acquired objects is plural, the processing proceeds to Step 1905.

In Step 1905, the metadata processing control unit 406 displays a warning screen as shown in FIG. 18 on the operation unit 203, for example. This warning screen includes a message showing that an identical drawing number is detected in different drawings and also includes a button for specifying whether the processing is continued or not.

When the user selects a "continue" button 1802 on the warning screen 1801, the processing proceeds to Step 1907 to continue the processing. The processings of Step 1907 to Step 1909 are the same as the processings of Step 1005 to Step 1007 of FIG. 10, respectively. When the user selects a "complete" button 1803 on the other hand, the processing is stopped to return to a status prior to the start of a scan.

According to this embodiment, when it is found that there are a plurality of objects having captions including an identical anchor expression, the user can have an opportunity to consider whether to continue the processing or not. Thus, the user can have an opportunity to stop the processing to try the second scan in order to add correct metadata.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network, or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059160, filed Mar. 16, 2010 which is hereby incorporated by reference herein in its entirety.

What is claimed is:

1. An image processing apparatus, comprising:
an area division unit configured to divide an image of a page into a plurality of areas;
an attribute information addition unit configured to add, to the plurality of divided areas, attribute information depending on an attribute determination of each of the areas so that when one of the areas is determined to be a caption area, caption attribute information is added to the caption area, when another of the areas is determined to be a body text area, body text attribute information is added to the body text area, and when another of the areas is determined to be an object area, object attribute information is added to the object area;
a character recognition unit configured to perform a character recognition processing on a caption area and a body text area; and
a metadata processing unit configured to associate metadata with an object area accompanied by a caption area, wherein the metadata processing unit comprises:
a first extraction unit configured to extract, from the result of the character recognition processing on the caption area, an anchor expression composed of a predetermined character string and a caption expression composed of a character string other than the anchor expression;
a first determination unit configured to determine whether there are a plurality of object areas accompanied by caption areas including an identical anchor expression;
a second extraction unit configured to extract, from the result of the character recognition processing on the body text area, an explanatory text including the anchor expression;
a first association unit configured to associate, in the case that the first determination unit determines that there is one object area accompanied by a caption area including the identical anchor expression, the determined one object area with metadata obtained from the explanatory text extracted by the second extraction unit;
a similarity degree calculation unit configured to calculate, in the case that the first determination unit determines that there are a plurality of object areas accompanied by caption areas including the identical anchor expression, similarity degrees between caption expressions of the respective caption areas including the identical anchor expression and the explanatory text including the anchor expression extracted by the second extraction unit, respectively; and
a second association unit configured to determine, based on the similarity degrees calculated by the similarity degree calculation unit, the explanatory texts that are optimal for the respective plurality of object areas accompanied by caption areas including the identical anchor expression and to associate metadata obtained from the determined optimal explanatory texts to the respective plurality of object areas accompanied by caption areas including the identical anchor expression.

2. The image processing apparatus according to claim 1, wherein the object areas accompanied by caption areas including the identical anchor expression are areas to which any one of photograph attribute information, drawing attribute information, and table attribute information is added by the attribute information addition unit.

3. The image processing apparatus according to claim 1, wherein the second association unit is configured to determine an explanatory text having the highest similarity degree calculated by the similarity degree calculation unit as an explanatory text optimal for each of the plurality of object areas accompanied by caption areas including the identical anchor expression and to associate metadata obtained from the optimal explanatory text for a particular object area with that particular object area.

4. The image processing apparatus according to claim 1, wherein
the area division unit is configured to divide each image of a plurality of pages into a plurality of areas,
the metadata processing unit further comprises a second determination unit configured to determine whether both the explanatory text extracted by the second extraction unit and one of the plurality of object areas accompanied by caption areas including the identical anchor expression exist within the image of the same page, and
the metadata processing unit is configured, in the case that the second determination unit determines that both the explanatory text extracted by the second extraction unit and one of the plurality of object areas accompanied by caption areas including the identical anchor expression exists within the image of the same page, to skip the calculation of the similarity degree by the similarity degree calculation unit and to associate metadata obtained from the explanatory text extracted from the image of a page with the one of the plurality object areas existing within the image of the same page.

5. The image processing apparatus according to claim 1, wherein the second association unit is configured, in the case that one of the similarity degrees reaches a predetermined threshold value, to associate metadata obtained from the optimal explanatory text determined based on the one of the similarity degrees with its respeective object area.

6. The image processing apparatus according to claim 1, wherein the metadata processing unit is configured, in the case that the first determination unit determines that there are a plurality of object areas accompanied by caption areas including the identical anchor expression, to provide a warning display showing the existence of the plurality of object areas.

7. The image processing apparatus according to claim 1, wherein the image processing apparatus further comprises a third association unit configured to associate the caption expression extracted by the first extraction unit as metadata with an object area accompanied by a caption area including the caption expression.

8. The image processing apparatus according to claim 1, wherein the image processing apparatus further comprises a generation unit configured to use information regarding the plurality of areas divided from the image of the page by the area division unit and metadata associated with the respective object areas to generate an electronic document having a predetermined format.

9. An image processing method, comprising:
   an area division step for dividing an image of a plurality of pages into a plurality of areas;
   an attribute information addition step for adding, to the respective plurality of divided areas, attribute information depending on an attribute determination of each of the areas so that when one of the areas is determined to be a caption area, caption attribute information is added to the caption area, when another of the areas is determined to be a body text area, body text attribute information is added to the body text area, and when another of the areas is determined to be an object area, object attribute information is added to the object area;
   a character recognition step for performing a character recognition processing on a caption area and a body text area; and
   a metadata processing step for associating metadata with an object area accompanied by a caption area,
   wherein the metadata processing step comprises:
      a first extraction step for extracting, from the result of the character recognition processing on the caption area, an anchor expression composed of a predetermined character string and a caption expression composed of a character string other than the anchor expression;
      a determination step for determining whether there are a plurality of object areas accompanied by caption areas including an identical anchor expression;
      a second extraction step for extracting, from the result of the character recognition processing on the body text area, an explanatory text including the anchor expression;
      a first association step for associating, in the case that the determination step determines that there is one object area accompanied by a caption area including the identical anchor expression, metadata obtained from the explanatory text extracted by the second extraction step with the determined one object area;
      a similarity degree calculation step for calculating, in the case that the determination step determines that there are a plurality of object areas accompanied by caption areas including the identical anchor expression, similarity degrees between caption expressions of the respective caption areas including the identical anchor expression and the explanatory text including the anchor expression extracted by the second extraction step, respectively; and
      a second association step for determining, based on the similarity degrees calculated by the similarity degree calculation step, the explanatory texts that are optimal for the respective plurality of object areas accompanied by caption areas including the identical anchor expression, and for associating metadata obtained from the determined optimal explanatory texts with the respective plurality of object areas accompanied by caption areas including the identical anchor expression.

10. A non-transitory computer-readable recording medium having computer-executable instructions for performing:
   an area division step for dividing images of a plurality of pages into a plurality of areas, respectively;
   an attribute information addition step for adding, to the respective plurality of divided areas, attribute information depending on an attribute determination of each of the areas so that when one of the areas is determined to be a caption area, caption attributed information is added to the caption area, when another of the areas is determined to be a body text area, body text attribute information is added to the body text area, and when another of the areas is determined to be an object area, object attribute information is added to the object area;
   a character recognition step for performing a character recognition processing on a caption area and a body text area; and
   a metadata processing step for associating metadata with an object area accompanied by a caption area,
   wherein the metadata processing step comprising:
      a first extraction step for extracting, from the result of the character recognition processing on the caption area, an anchor expression composed of a predetermined character string and a caption expression composed of a character string other than the anchor expression;
      a determination step for determining whether there are a plurality of object areas accompanied by caption areas including an identical anchor expression;
      a second extraction step for extracting, from the result of the character recognition processing on the body text area, an explanatory text including the anchor expression;
      a first association step for associating, when the determination step determines that there is one object area accompanied by a caption area including the identical anchor expression, metadata obtained from the explanatory text extracted by the second extraction step with the determined one object area;
      a similarity degree calculation step for calculating, when the determination step determines that there are a plurality of object areas accompanied by caption areas including the identical anchor expression, similarity degrees between caption expressions of the respective caption areas including the identical anchor expression and the explanatory text including the anchor expression extracted by the second extraction step, respectively; and
      a second association step for determining, based on the similarity degrees calculated by the similarity degree calculation step, the explanatory texts that are optimal for the respective plurality of object areas accompanied by caption areas including the identical anchor expression to associate metadata obtained from the determined optimal explanatory texts with the respective plurality of object areas accompanied by caption areas including the identical anchor expression.

* * * * *